United States Patent
Li et al.

(10) Patent No.: US 12,340,771 B2
(45) Date of Patent: Jun. 24, 2025

(54) METHOD OF WAVELENGTH SELECTION AND APPARATUS

(71) Applicant: HUAWEI TECHNOLOGIES CO., LTD., Guangdong (CN)

(72) Inventors: Tenghao Li, Shenzhen (CN); Hui Xiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 18/178,610

(22) Filed: Mar. 6, 2023

(65) Prior Publication Data

US 2023/0206869 A1 Jun. 29, 2023

Related U.S. Application Data

(63) Continuation of application No. PCT/CN2021/111458, filed on Aug. 9, 2021.

(30) Foreign Application Priority Data

Sep. 7, 2020 (CN) .......................... 202010929689.1

(51) Int. Cl.
*H04J 14/02* (2006.01)
*G09G 3/36* (2006.01)

(52) U.S. Cl.
CPC .......... *G09G 3/36* (2013.01); *G09G 2310/04* (2013.01); *G09G 2340/0435* (2013.01)

(58) Field of Classification Search
CPC ................................................ H04J 14/0212
See application file for complete search history.

(56) References Cited

U.S. PATENT DOCUMENTS

| 7,852,307 B2 | 12/2010 | Hudson | |
|---|---|---|---|
| 2013/0028556 A1* | 1/2013 | Cohen | G02B 6/356 |
| | | | 385/17 |
| 2018/0167139 A1* | 6/2018 | Inoue | H04B 10/07953 |
| 2022/0182167 A1* | 6/2022 | Kawahara | H04J 14/0212 |

FOREIGN PATENT DOCUMENTS

| CN | 103021371 A | 4/2013 |
|---|---|---|
| CN | 104485076 A | 4/2015 |
| CN | 107622760 A | 1/2018 |
| EP | 3696599 A1 | 8/2020 |

OTHER PUBLICATIONS

Extended European Search Report dated Jan. 23, 2024, issued for European Application No. 21863473.1 (12 pages).

International Search Report dated Oct. 29, 2021, issued for International Application No. PCT/CN2021/111458 (10 pages).

* cited by examiner

*Primary Examiner* — Shi K Li

(57) ABSTRACT

A method of wavelength selection and a communication apparatus is applied to fields such as optical communication, optical switching, digital central networks, microwave photonics, liquid crystal antennas, optical phased arrays, beam forming, beam scanning, laser radars, laser projection, laser televisions, holographic display, adaptive optics, laser beam shaping, laser processing, ultrafast laser pulse shaping, laser active imaging, optical tomography scanning, and retinal imaging. When port switching occurs in a WSS apparatus, only image data of a changed local image of an LCoS image is updated within each time interval that is shorter than duration of one image frame, and a driving voltage for a pixel on the LCoS display screen is refreshed based on a priority.

20 Claims, 10 Drawing Sheets

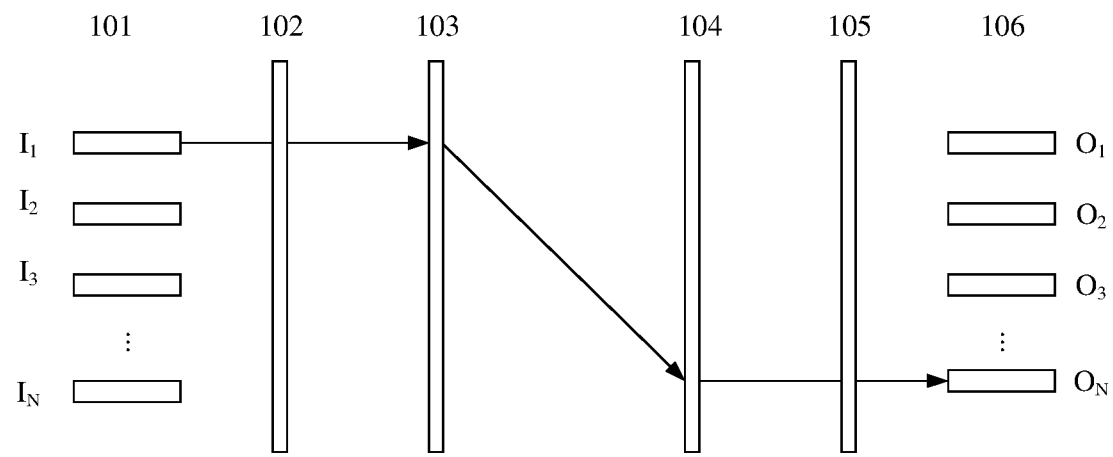
(a)
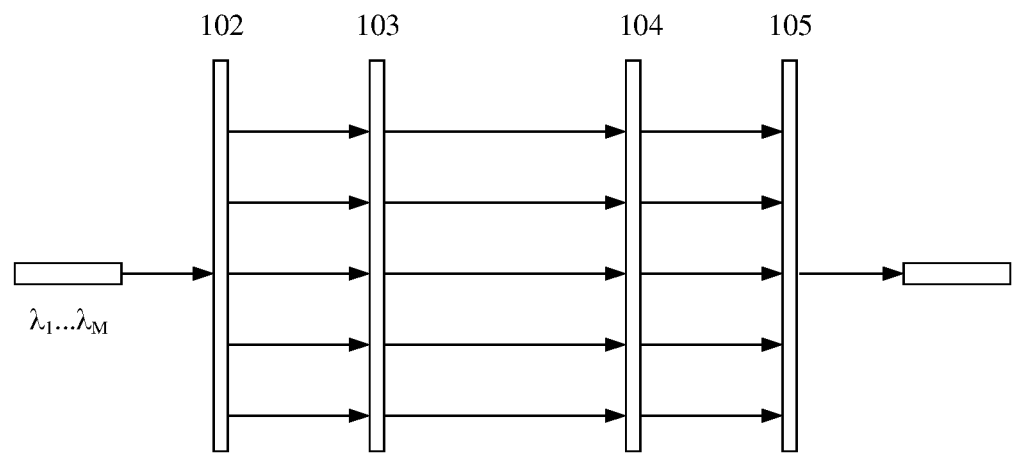
(b)
FIG. 1

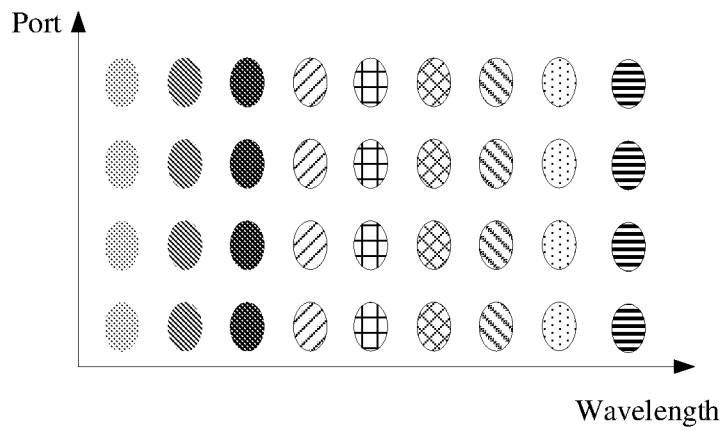

Obtain port status information of a WSS apparatus, where the port status information includes information that for an optical signal with a first wavelength from a first input port of the WSS apparatus, a first output port is to be switched to a second output port, the WSS apparatus includes N input ports, each input port supports M wavelengths, and both N and M are positive integers ⟶ 310

Update a sub-image that is of an LCoS image of the WSS apparatus and that corresponds to the optical signal with the first wavelength from the first input port to a first sub-image, where the LCoS image is divided into N×M sub-images, and each sub-image corresponds to one pixel area on an LCoS display screen of the WSS apparatus ⟶ 320

Refresh a driving voltage for a pixel in a first area on the LCoS display screen, where the first area includes a first pixel area on the LCoS display screen that corresponds to the first sub-image ⟶ 330

Refresh a driving voltage for a pixel in another area on the LCoS display screen that is not the first area ⟶ 340

FIG. 3

METHOD OF WAVELENGTH SELECTION AND APPARATUS

CROSS-REFERENCE TO RELATED APPLICATIONS

This application is a continuation of International Application No. PCT/CN2021/111458, filed on Aug. 9, 2021, which claims priority to Chinese Patent Application No. 202010929689.1, filed on Sep. 7, 2020. The disclosures of the aforementioned applications are hereby incorporated by reference in their entireties.

TECHNICAL FIELD

This disclosure relates to the optical communication field, and more specifically, to a method of wavelength selection and an apparatus.

BACKGROUND

Optical networks are evolving into having a large capacity, a low latency, and high intelligence. Optical switching technologies, such as a reconfigurable optical add-drop multiplexer (ROADM) and an optical cross-connect (OXC), not only support current commercial optical networks, but also are one of key technologies for implementing next-generation optical networks. As a core component of the OXC, a wavelength selective switch (WSS) is capable of fast switching, and this is of a great value to stronger capabilities of scheduling and protection for complex networks. At present, according to a requirement on rerouting time of an automatically switched optical network (ASON), link protection switching time is 50 ms.

In the WSS, liquid crystal on silicon (LCoS) is a core switching engine of the WSS, and main functions of the LCoS are programmable implementation of a reflection diffraction grating with a specific phase distribution, and deflecting an incident light beam to a corresponding outgoing direction. Conventionally, the LCoS is developed for display applications Image data is refreshed based on a frame rate. Generally, the frame rate is 60 Hz. In addition, a pixel driving voltage is refreshed in cycles in a fixed sequence. Such a manner of driving with a fixed refresh rate fails to achieve optimal performance for WSS applications. Especially in a WSS with a large quantity of ports, a resolution of the LCoS will further scale up, and an existing method for driving the LCoS cannot satisfy a requirement for faster switching of a WSS apparatus.

SUMMARY

This disclosure provides a method of wavelength selection and an apparatus that can achieve faster port switching of a WSS apparatus.

According to a first aspect, this disclosure provides a method of wavelength selection by using a WSS apparatus, and the method includes:
  obtaining port status information of a WSS apparatus, where the port status information includes information that for an optical signal with a first wavelength from a first input port of the WSS apparatus, a first output port is to be switched to a second output port, where the WSS apparatus includes N input ports, each input port supports M wavelengths, and both N and M are positive integers;
  updating a sub-image that is of an LCoS image of the WSS apparatus and that corresponds to the optical signal with the first wavelength from the first input port to a first sub-image, where the LCoS image is divided into N×M sub-images, and each sub-image corresponds to one pixel area on an LCoS display screen of the WSS apparatus;
  refreshing, based on the first sub-image, a driving voltage for a pixel in a first area on the LCoS display screen, where the first area includes a first pixel area on the LCoS display screen that corresponds to the first sub-image; and
  refreshing a driving voltage for a pixel in another area on the LCoS display screen that is not the first area.

In the technical solutions of this disclosure, in view of usually, only individual ports of the WSS apparatus needing a switch, an LCoS image of the WSS apparatus changes only locally. Therefore, in this disclosure, when switching of a port of the WSS apparatus occurs, preferentially, a driving voltage for a pixel in a part of an area (namely, the first area) on the LCoS display screen is refreshed, and then a driving voltage for a pixel in another area other than the part of the area is refreshed. The part of the area includes at least a pixel area on the LCoS display screen that corresponds to an optical signal with a wavelength (for example, the first wavelength from the first input port) that is in M wavelengths supported by a switched port and that for which switching of an output port occurs. To be specific, when switching of an output port for the optical signal with the first wavelength from the first input port occurs, preferentially, a driving voltage for a pixel in a first pixel area on the LCoS display screen that corresponds to the optical signal with the first wavelength from the first input port or in a local area including the first pixel area (collectively referred to as the first area) is refreshed at first, and then a driving voltage for a pixel in another area on the LCoS display screen that is not the first area is refreshed. This can achieve faster port switching, compared with refreshing driving voltages for pixels on an entire LCoS display screen in a fixed sequence of pixel numbers.

It should be noted that, in some implementations, the first area is specifically the first pixel area on the LCoS display screen that corresponds to the first sub-image corresponding to the optical signal with the first wavelength from the first input port.

However, in some other implementations, a size of the first area is greater than a size of the first pixel area. In other words, the first area includes an area other than the first pixel area, or the first area not only includes a pixel in the first pixel area, but also includes a part of pixels on the LCoS display screen that is not in the first pixel area.

With reference to the first aspect, in some implementations of the first aspect, the obtaining port status information of a WSS apparatus includes: receiving a port switching command within a $(j-1)^{th}$ time interval, where the port switching command is used to instruct a switch from the first output port to the second output port for outputting the optical signal with the first wavelength from the first input port; and
  the updating a sub-image that is of an LCoS image of the WSS apparatus and that corresponds to the optical signal with the first wavelength from the first input port to a first sub-image includes:
  updating, within a $j^{th}$ time interval, the sub-image that is of the LCoS image and that corresponds to the optical signal with the first wavelength from the first input port to the first sub-image, where j≥1, j is an integer, and one time interval is shorter than duration of one image frame.

When port switching occurs, image data of a local image of the LCoS image changes. In a process of refreshing the image data of the local image, in this disclosure, one time interval is used as a granularity (or unit) for refreshing, and one time interval is shorter than duration of one existing image frame. Therefore, compared with refreshing based on a frame rate, it takes a shorter time for the LCoS device to wait to receive a port switching command that may appear at any time, helping to speed up port switching.

With reference to the first aspect, in some implementations of the first aspect, the method further includes:
  obtaining a port status and a port number of the first input port according to the port switching command;
  generating image data of the first sub-image based on the port status of the first input port, and determine, based on the port number of the first input port, the first pixel area on the LCoS display screen that corresponds to the first sub-image; and
  determining, based on the image data of the first sub-image, a first driving voltage that needs to be loaded to a pixel in the first pixel area.

After the port switching command is received, a status and a number of the switched port are carried in the port switching command. For any input port of the WSS apparatus, when an optical signal with a specific wavelength from the input port is output from different output ports, the optical signal with the wavelength from the input port corresponds to different sub-images of the LCoS image. Therefore, if the port switching command indicates that for the optical signal with the first wavelength from the first input port, the first output port is to be switched to the second output port for outputting, a local image (namely, the first sub-image) of the LCoS image that corresponds to the optical signal with the first wavelength from the first input port and a pixel area on the LCoS display screen that corresponds to the local image may be obtained. Updated image data of the local image may be converted into a driving voltage for a pixel in a corresponding pixel area on the LCoS display screen. By loading the driving voltage obtained by converting the updated image data of the local image to a corresponding pixel on the LCoS display screen, the liquid crystal of the LCoS display screen can be driven to work, thereby implementing port switching.

With reference to the first aspect, in some implementations of the first aspect, before a port status of the WSS apparatus is obtained, the method further includes:
  generating a pixel refresh queue, where the pixel refresh queue includes a driving voltage for a pixel on the LCoS display screen that corresponds to the N input ports of the WSS apparatus; and
  the refreshing, based on the first sub-image, a driving voltage for a pixel in a first area on the LCoS display screen includes:
  updating the driving voltage that is for the pixel in the first pixel area and that is included in the pixel refresh queue to the driving voltage, determined based on the image data of the first sub-image, that needs to be loaded to the pixel in the first pixel area; and
  obtaining the driving voltage for the pixel in the first area from the pixel refresh queue, and loading the driving voltage to a corresponding pixel in a pixel array of the LCoS display screen.

Before port switching occurs in the WSS apparatus, the LCoS device generates an initial pixel refresh queue, where the pixel refresh queue includes a driving voltage for a pixel on the LCoS display screen that corresponds to the N input ports of the WSS apparatus. The LCoS device refreshes, based on a correspondence between each driving voltage in the pixel refresh queue and a pixel on the LCoS display screen, a driving voltage for each pixel on the LCoS display screen, thereby driving the liquid crystal of the LCoS display screen to work. After switching of the output port for the optical signal with the first wavelength from the first input port occurs, the sub-image that is of the LCoS image and that corresponds to the optical signal with the first wavelength from the first input port is updated to a new sub-image, for example, updated to the first sub-image. The LCoS device calculates, based on the image data of the first sub-image, the driving voltage for the pixel in the first pixel area on the LCoS display screen that corresponds to the first sub-image, and updates the driving voltage for the pixel that is in the first pixel area and that is included in the pixel refresh queue to the driving voltage obtained through calculation based on the image data of the first sub-image. Then, by updating the driving voltage for the pixel in the first pixel area to the driving voltage obtained through calculation based on the image data of the first sub-image, the LCoS device drives the liquid crystal for the pixel in the first pixel area to work, thereby completing switching of an output port, for the optical signal with the first wavelength from the first input port, from the first output port to the second output port.

With reference to the first aspect, in some implementations of the first aspect, the method further includes:
  adjusting a priority of a pixel number of a pixel that is in the pixel refresh queue and that corresponds to the optical signal with the first wavelength from the first input port to a higher priority than a priority of a pixel number of another pixel, where the pixel refresh queue further includes a pixel number of the pixel on the LCoS display screen that corresponds to the N input ports, and a priority of each pixel number in the pixel refresh queue indicates a priority of refreshing a driving voltage for a pixel corresponding to the pixel number; and
  refreshing, based on an adjusted priority of each pixel number in the pixel refresh queue, the driving voltage for the pixel in the another area on the LCoS display screen that is not the first area, where the first area is the first pixel area.

To refresh a driving voltage for a pixel on the LCoS display screen based on a priority, the LCoS device maintains one pixel refresh queue. For example, in addition to the driving voltage for the pixel on the LCoS display screen that corresponds to the N input ports of the WSS apparatus, the pixel refresh queue further includes a pixel number of a pixel on the LCoS display screen that corresponds to each port of the WSS apparatus. Each pixel number has a corresponding priority in the pixel refresh queue, and the priority of each pixel number is the same as the priority of refreshing the driving voltage for the pixel corresponding to the pixel number. Alternatively, in other words, the priority of each pixel number in the pixel refresh queue indicates a priority of refreshing a driving voltage for a pixel corresponding to each pixel number. After port switching occurs, the LCoS device adjusts priorities of a part of pixel numbers to higher priorities than a priority of another pixel number, and refreshes, based on an adjusted priority of each pixel number, from high to low, the driving voltage for the pixel corresponding to each pixel number, thereby refreshing a driving voltage for a pixel based on a priority. This manner of refreshing reduces a waiting time for refreshing.

Specifically, in this implementation, when switching of the output port for the optical signal with the first wavelength from the first input port occurs, the LCoS device adjusts a priority of a pixel number, included in the pixel refresh queue, of a pixel in the first pixel area on the LCoS display screen that corresponds to the optical signal with the first wavelength from the first input port to a higher priority than a priority of a pixel number of another pixel on the LCoS display screen. Then, the LCoS device refreshes the driving voltage for the pixel on the LCoS display screen based on the adjusted priority of the pixel number in the pixel refresh queue. As the priority of the pixel number of the pixel in the first pixel area is adjusted to a highest priority, the driving voltage for the pixel in the first pixel area on the LCoS display screen is refreshed preferentially. A pixel on the LCoS display screen that is not in the first pixel area is refreshed based on an adjusted priority of a corresponding pixel number in the pixel refresh queue.

In addition, duration of refreshing the pixel driving voltage may be decoupled from a pixel resolution, and may be decoupled from a subframe rate or a frame rate.

For example, a pixel number and a driving voltage for a pixel corresponding to the pixel number may be stored separately, or may be stored together. When being stored together, each pixel number is in a one-to-one correspondence with a driving voltage for a pixel corresponding to the pixel number. In other words, each pixel number is associated with one driving voltage. This manner of storage can reduce the complexity of reading.

In an implementation, in a process of refreshing a pixel driving voltage, for example, each time one pixel number is read based on a priority of the pixel number, a driving voltage corresponding to (or associated with) the pixel number is read as well, and the driving voltage that is read is loaded to a pixel whose address in a pixel array of the LCoS display screen corresponds to the pixel number. Sequentially, each pixel number is read and the driving voltage corresponding to the pixel number is read and refreshed based on a priority of each pixel number in the pixel refresh queue, to complete refreshing of a driving voltage for each pixel in the pixel array.

With reference to the first aspect, in some implementations of the first aspect, after the port status information of the WSS apparatus is obtained, the method further includes:
  adjusting a priority of a pixel number of a pixel that is in the pixel refresh queue and that corresponds to the first input port to a higher priority than a priority of a pixel number of a pixel on the LCoS display screen that corresponds to another port of the WSS apparatus, where the pixel refresh queue further includes a pixel number of the pixel on the LCoS display screen that corresponds to the N input ports, and a priority of each pixel number in the pixel refresh queue indicates a priority of refreshing a driving voltage for a pixel corresponding to the pixel number; and
  the refreshing a driving voltage for a pixel in another area on the LCoS display screen that is not the first area includes:
  refreshing, based on an adjusted priority of each pixel number in the pixel refresh queue, the driving voltage for the pixel in the another area on the LCoS display screen that is not the first area, where the first area is a pixel area on the LCoS display screen that corresponds to the first input port.

Specifically, in this implementation, when switching of the output port for the optical signal with the first wavelength from the first input port occurs, the LCoS device adjusts a priority of a pixel number, included in the pixel refresh queue, of a pixel in a pixel area on the LCoS display screen that corresponds to the first input port to a higher priority than a priority of a pixel number of a pixel on the LCoS display screen that corresponds to other (N−1) input ports of the WSS apparatus. The pixel area on the LCoS display screen that corresponds to the first input port is defined as the first area. Then, the LCoS device refreshes the driving voltage for the pixel on the LCoS display screen based on the adjusted priority of the pixel number in the pixel refresh queue. As the priority of the pixel number of the pixel in the first area on the LCoS display screen that corresponds to the first input port is adjusted to a highest priority, a driving voltage for the pixel in the first area on the LCoS display screen is refreshed preferentially. A pixel on the LCoS display screen that is not in the first area is refreshed based on an adjusted priority of a corresponding pixel number in the pixel refresh queue.

It can be learned that, compared with the first pixel area on the LCoS display screen that corresponds to the optical signal with the first wavelength from the first input port, a size of the first area on the LCoS display screen that corresponds to the first input port is larger. In addition to the first pixel area, the first area further includes a pixel area on the LCoS display screen that corresponds to an optical signal with another wavelength (that specifically includes remaining M−1 wavelengths other than the first wavelength) from the first input port. As the driving voltage for the pixel in the first area is refreshed preferentially, and then the driving voltage for the pixel in the another area other than the first area is refreshed, compared with refreshing the entire LCoS display screen in a fixed sequence of pixel numbers, a waiting time can be reduced, and port switching can be faster.

With reference to the first aspect, in some implementations of the first aspect, after the port status information of the WSS apparatus is obtained, the method further includes:
  adjusting a priority of a pixel number of a pixel that is in the pixel refresh queue and that corresponds to an optical signal with the first wavelength from the N input ports to a higher priority than a priority of a pixel number of a pixel corresponding to an optical signal with another wavelength from the N input ports, where the pixel refresh queue further includes a pixel number of the pixel on the LCoS display screen that corresponds to the N input ports, and a priority of each pixel number in the pixel refresh queue indicates a priority of refreshing a driving voltage for a pixel corresponding to the pixel number; and
  the refreshing a driving voltage for a pixel in another area on the LCoS display screen that is not the first area includes:
  refreshing, based on an adjusted priority of each pixel number in the pixel refresh queue, the driving voltage for the pixel in the another area on the LCoS display screen that is not the first area, where the first area is a pixel area on the LCoS display screen that corresponds to the optical signal with the first wavelength from the N input ports.

Specifically, in this implementation, when switching of the output port for the optical signal with the first wavelength from the first input port occurs, the LCoS device adjusts a priority of a pixel number, included in the pixel refresh queue, of a pixel in a pixel area on the LCoS display screen that corresponds to an optical signal with the first wavelength from the N input ports of the WSS apparatus to a higher priority than a priority of a pixel number of a pixel on the LCoS display screen that corresponds to optical signals with other wavelengths (that specifically are the remaining M−1 wavelengths) from the N input ports of the WSS apparatus. The pixel area on the LCoS display screen that corresponds to the optical signal with the first wavelength from the N input ports is defined as the first area. Then, the LCoS device refreshes the driving voltage for the pixel on the LCoS display screen based on the adjusted priority of the pixel number in the pixel refresh queue. As the priority of the pixel number of the pixel in the first area on the LCoS display screen that corresponds to the optical signal with the first wavelength from the N input ports is adjusted to a highest priority, a driving voltage for the pixel in the first area on the LCoS display screen is refreshed preferentially. A pixel on the LCoS display screen that is not in the first area is refreshed based on an adjusted priority of a corresponding pixel number in the pixel refresh queue.

It can be learned that, compared with the first pixel area on the LCoS display screen that corresponds to the optical signal with the first wavelength from the first input port, a size of the first area on the LCoS display screen that corresponds to the optical signals with the first wavelength from the N input ports is larger. In addition to the pixel area on the LCoS display screen that corresponds to the first wavelength from the first input port (namely, the first pixel area), the first area further includes a pixel area on the LCoS display screen that corresponds to an optical signal with the first wavelength from another input port that is in the N input ports and that is not the first input port. As the driving voltage for the pixel in the first area is refreshed preferentially, and then the driving voltage for the pixel in the another area other than the first area is refreshed, compared with refreshing the entire LCoS display screen in a fixed sequence of pixel numbers, a waiting time can be reduced, and port switching becomes faster.

With reference to the first aspect, in some implementations of the first aspect, the refreshing a driving voltage for a pixel in another area on the LCoS display screen that is not the first area includes:

refreshing, based on the priority of the pixel number in the pixel refresh queue, the driving voltage for the pixel in the another area on the LCoS display screen that is not the first area, where the pixel refresh queue includes the pixel number of the pixel on the LCoS display screen that corresponds to the N input ports, and a priority of each pixel number in the pixel refresh queue indicates a priority of refreshing a driving voltage for a pixel corresponding to the pixel number.

Compared with the foregoing three solutions in which priorities of a part of pixel numbers in the pixel refresh queue are adjusted, and then a driving voltage for a pixel on the LCoS display is refreshed based on an adjusted priority of a pixel number, in another implementation, for example, after port switching occurs, the LCoS device does not adjust a priority of a pixel number in the pixel refresh queue, but directly refreshes a pixel on the LCoS display screen after obtaining status information of a switched port. However, in a process of refreshing, the driving voltage for the pixel in the first area needs to be refreshed preferentially, and then the driving voltage for the pixel in the another area other than the first area is refreshed.

With reference to the first aspect, in some implementations of the first aspect, the pixel on the LCoS display screen that corresponds to the first input port includes the pixel in the first pixel area, and the priority of the pixel number of the pixel in the first pixel area is higher than a priority of a pixel number of a pixel on the LCoS display screen that corresponds to an optical signal with another wavelength other than the first wavelength from the first input port, where the driving voltage for the pixel on the LCoS display screen may be refreshed in the following sequence:
refreshing a driving voltage for a pixel in the first pixel area on the LCoS display screen that corresponds to the optical signal with the first wavelength from the first input port;
refreshing a pixel in the pixel area on the LCoS display screen that corresponds to the optical signal with another wavelength from the first input port; and
refreshing a pixel in a pixel area on the LCoS display screen that corresponds to another input port of the WSS apparatus that is not the first input port.

In this implementation, after switching of the output port for the optical signal with the first wavelength from the first input port occurs, a priority of refreshing a driving voltage for a pixel in a pixel area on the LCoS display screen that corresponds to the port to which switching has occurred is higher than a priority of refreshing a driving voltage for a pixel in a pixel area on the LCoS display screen that corresponds to another port. Inside the switched port, a priority of the switched first wavelength is higher than a priority of another wavelength that has not undergone a switch.

With reference to the first aspect, in some implementations of the first aspect, for an input port that has not undergone a switch, priorities of refreshing driving voltages for pixels corresponding to the input port are ranked in an ascending sequence of pixel numbers, from high to low.

For example, in an implementation, priorities of refreshing driving voltages for pixels that correspond to different ports of the WSS apparatus are ranked, based on a time at which switching of each port occurs, from latest to earliest in a pixel refresh queue. For one port, initial priorities of refreshing (or priorities of refreshing when no switching has occurred) of various pixels corresponding to the port are ranked in an ascending sequence of pixel numbers.

With reference to the first aspect, in some implementations of the first aspect, the method further includes:
obtaining a row address and a column address that are in the pixel array of the LCoS display screen and that correspond to the pixel number of the pixel in the first area; and
the obtaining the driving voltage for the pixel in the first area from the pixel refresh queue, and loading the driving voltage to a corresponding pixel in a pixel array of the LCoS display screen includes:
obtaining based on the adjusted priority of each pixel number in the pixel refresh queue, a driving voltage corresponding to the pixel number of the pixel in the first area from the pixel refresh queue; and
performing addressing in the pixel array based on the row address and the column address that are in the pixel array and that correspond to the pixel number of the pixel in the first area, and loading the driving voltage corresponding to the pixel number of the pixel in the first area to the pixel corresponding to the row address and the column address in the pixel array.

After port switching occurs, based on a changed local sub-image of the LCoS image, the first area on the LCoS display screen that corresponds to the local sub-images is obtained, and the row address and the column address that are in the pixel array of the LCoS display screen and that correspond to the pixel number of the pixel in the first area may be obtained. In this way, the driving voltage for the pixel in the first area can be refreshed preferentially with accuracy, thereby refreshing a driving voltage for a pixel on the LCoS display based on a priority. Compared with an existing solution in which a driving voltage is refreshed in a fixed sequence of pixel numbers (for example, in an ascending sequence of pixel numbers), a waiting time is reduced. In addition, duration of refreshing the pixel driving voltage may be decoupled from a pixel resolution, and may be decoupled from a subframe rate or a frame rate.

With reference to the first aspect, in some implementations of the first aspect, the method further includes:
obtaining a row address that is in the pixel array of the LCoS display screen and that corresponds to the pixel number of the pixel in the first area; and
the obtaining the driving voltage for the pixel in the first area from the pixel refresh queue, and loading the driving voltage to a corresponding pixel in a pixel array of the LCoS display screen includes:
obtaining based on the adjusted priority of each pixel number in the pixel refresh queue, a driving voltage corresponding to the pixel number of the pixel in the first area from the pixel refresh queue; and
performing row addressing in the pixel array based on the row address that is in the pixel array and that corresponds to the pixel number of the pixel in the first area, and loading, with individual columns in serial or a plurality of columns in parallel, the driving voltage corresponding to the pixel number of the pixel in the first area to the pixel corresponding to the row address in the pixel array.

In this embodiment, in a process of refreshing the driving voltage for the pixel on the LCoS display screen, row addressing is performed, and for a column, shifting is performed with individual columns in serial or a plurality of columns in parallel. Therefore, in a process of refreshing the driving voltage, only the row address needs to be transmitted and stored, thereby reducing overheads taken up by a pixel address, and improving effective bandwidth utilization.

With reference to the first aspect, in some implementations of the first aspect, the method further includes:
obtaining a column address that is in the pixel array of the LCoS display screen and that corresponds to a pixel number of the pixel in the first area; and
the obtaining the driving voltage for the pixel in the first area from the pixel refresh queue, and loading the driving voltage to a corresponding pixel in a pixel array of the LCoS display screen includes:
obtaining based on the adjusted priority of each pixel number in the pixel refresh queue, a driving voltage corresponding to the pixel number of the pixel in the first area from the pixel refresh queue; and
performing column addressing in the pixel array based on the column address that is in the pixel array and that corresponds to the pixel number of the pixel in the first area, and loading, with individual rows in serial or a plurality of rows in parallel, the driving voltage corresponding to the pixel number of the pixel in the first area to the pixel corresponding to the column address in the pixel array.

In this embodiment, in a process of refreshing the driving voltage for the pixel on the LCoS display screen, column addressing is performed, and for a row, shifting is performed with individual rows in serial or a plurality of rows in parallel. Therefore, in a process of refreshing the driving voltage, only the column address needs to be transmitted and stored, thereby reducing overheads taken up by a pixel address, and improving effective bandwidth utilization.

With reference to the first aspect, in some implementations of the first aspect, the method further includes:
when switching of an output port for an optical signal from each input port of the WSS apparatus does not occur, refreshing, within each time interval, based on a priority of each pixel number in a pixel refresh queue, a driving voltage for a pixel on the LCoS display screen that corresponds to the pixel number, where one time interval is shorter than duration of one image frame, where
the pixel refresh queue includes a pixel number of a pixel on the LCoS display screen that corresponds to the N input ports, and a priority of each pixel number in the pixel refresh queue indicates a priority of refreshing a driving voltage for a pixel corresponding to the pixel number.

In this disclosure, if port switching does not occur in the WSS apparatus, the LCoS device starts a process of refreshing an LCoS image. Specifically, one time interval is used as a granularity for refreshing, and one time interval is shorter than duration of one existing image frame. Compared with refreshing based on a frame rate, it takes a shorter time for the LCoS device to wait to receive a port switching command that may appear at any time, helping to speed up port switching when port switching occurs subsequently.

According to a second aspect, this disclosure provides a communication apparatus. The communication apparatus has a function of implementing the method in the first aspect or any possible implementation of the first aspect. The function may be implemented by hardware, or may be implemented by hardware executing corresponding software. The hardware or the software includes one or more units corresponding to the foregoing function.

According to a third aspect, this disclosure provides a WSS apparatus, including the communication apparatus according to the second aspect or any possible implementation of the second aspect.

According to a fourth aspect, this disclosure provides a communication apparatus, including at least one processor. The at least one processor is coupled to at least one memory, and the at least one processor is configured to execute a computer program or instructions stored in the at least one memory, to enable the communication apparatus to perform the method in the first aspect or any possible implementation of the first aspect.

According to a fifth aspect, this disclosure provides a communication apparatus, including a processor and a communication interface. The communication interface is configured to: receive a signal, and transmit the received signal to the processor, and the processor processes the signal, to enable the communication apparatus to perform the method in the first aspect or any possible implementation of the first aspect.

Optionally, the communication interface may be an interface circuit, an input/output interface, or the like. The processor may be a processing circuit, a logic circuit, or the like.

Optionally, the communication apparatus according to the fifth aspect may be a chip or an integrated circuit.

According to a sixth aspect, this disclosure provides a computer-readable storage medium. The computer-readable storage medium stores computer instructions, and when the computer instructions are run on a computer, the method in the first aspect or any possible implementation of the first aspect is performed.

According to a seventh aspect, this disclosure provides a computer program product. The computer program product includes computer program code, and when the computer program code is run on a computer, the method in the first aspect or any possible implementation of the first aspect is performed.

According to an eighth aspect, this disclosure provides an optical switching apparatus, including the WSS apparatus according to the third aspect.

BRIEF DESCRIPTION OF DRAWINGS

FIG. 1 illustrates an N×N WSS apparatus;

FIG. 2 is a schematic diagram of N ports of a WSS apparatus and a wavelength path supported by the N ports;

FIG. 3 is a flowchart of a method 300 of wavelength selection by using a WSS apparatus according to this disclosure;

DESCRIPTION OF EMBODIMENTS

Figure 4:
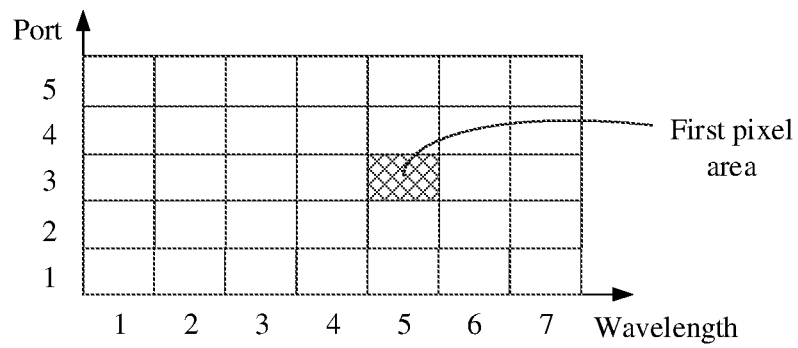
FIG. 4 is an example of a first area on an LCoS display screen according to this disclosure.

The following describes technical solutions of this disclosure with reference to the accompanying drawings.

The technical solutions of this disclosure can be applied to fields such as optical communication, optical switching, digital central networks, microwave photonics, liquid crystal antennas, optical phased arrays, beam forming, beam scanning, laser radars, laser projection, laser televisions, holographic display, adaptive optics, laser beam shaping, laser processing, ultrafast laser pulse shaping, laser active imaging, optical tomography scanning, and retinal imaging. For example, the technical solutions may be used in an optical switching apparatus (or an optical switching structure) in these fields, for example, a core component of a reconfigurable optical add-drop multiplexer (ROADM) and an optical cross-connect (OXC) device, namely, a WSS apparatus.

Refer to FIG. 1. FIG. 1 illustrates an N×N WSS apparatus. (a) in FIG. 1 is a front view of an N×N WSS apparatus. That is, the WSS apparatus has N input ports and N output ports, and can implement a full-fiber connection between any pair of the input ports and the output ports. In other words, optical signals with any wavelength from the N input ports may be output from any one of the N output ports. It should be understood that in (a) in FIG. 1, a quantity of the output ports is equal to a quantity of the output ports, and both are N. This is merely used as an example for description. In a specific implementation, quantities of the input ports and the output ports may not be equal, for example, in a case of 1×N, N×M, or the like, where both N and M are positive integers.

Specifically, main components of the WSS apparatus include: an input port fiber array (101), an output port fiber array (106), light-splitting gratings (102) and (105), and two LCoSs (103) and (104). Alternatively, the LCoS (103) may be referred to as a first LCoS below, and the LCoS (104) may be referred to as a second LCoS below. For different input ports, the first LCoS can independently deflect a corresponding light beam. For different output ports, the second LCoS can independently deflect a corresponding light beam.

To more clearly present a relationship between angles of deflection of a light beam through the first LCoS and the second LCoS (for example, the angles of deflection are equal), a diagram of refraction is shown in (a) in FIG. 1.

(b) in FIG. 1 is a top view of the N×N WSS apparatus. The input port fiber array (101) and the input port fiber array (106) are stacked. Wavelength division multiplexing is applied to optical signals transmitted through each input port fiber, and each input port may support M wavelength paths. The light-splitting grating (102) splits optical signals from each input port based on a wavelength, and a corresponding light beam is incident on the first LCoS (103). The light-splitting grating (105) combines light beams out of the second LCoS (104), and a corresponding multi-wavelength optical signal arrives at an output port. In a specific implementation of the apparatus, the light-splitting grating (102) and the light-splitting grating (105) may be combined into a same device according to different optical designs. This is not limited. For different wavelength paths, the first LCoS (103) and the second LCoS (104) may independently deflect a corresponding light beam.

Refer to FIG. 2. FIG. 2 is a schematic diagram of N ports of a WSS apparatus and a wavelength path supported by the N ports. As shown in FIG. 2, it is assumed that the WSS apparatus has a total of N ports, and each port supports M wavelength paths, and an N×M spot array is formed. The N×M spot array is an LCoS image of the WSS apparatus, and each spot is referred to as a sub-image. Correspondingly, the LCoS (103) and the LCoS (104) of the WSS apparatus are divided into N×M pixel areas, to adjust a corresponding light beam for deflection. Each sub-image of the LCoS image corresponds to one pixel area on the LCoS display screen.

Refer to FIG. 3. FIG. 3 is a flowchart of a method 300 of wavelength selection by using a WSS apparatus according to this disclosure.

Optionally, the method 300 may be performed by an LCoS device (for example, 103 or 104 in FIG. 1) in the WSS apparatus, or performed by a chip, an integrated circuit, or the like that is integrated into the LCoS device and that has a corresponding function of the LCoS device described in this disclosure. This is not limited. An example in which the method is performed by the LCoS device is used below for description.

310: The LCoS device obtains port status information of the WSS apparatus.

The port status information includes information that for an optical signal with a first wavelength from a first input port of the WSS apparatus, a first output port is to be switched to a second output port.

For example, the WSS apparatus includes N input ports, and each input port supports M wavelengths. The port status information of the WSS apparatus indicates a status related to outputting an optical signal from an input port of the WSS apparatus from an output port. For example, "input port n switching", "input port n connected to output port m", "input port n off and not connected to any output port", or the like. It should be understood that the input port n refers to any one of the input ports of the WSS apparatus, and the output port m refers to any one of the output ports of the WSS apparatus.

Quantities of the input ports and the output ports of the WSS apparatus are not limited in the technical solutions of this disclosure. For example, the technical solutions of this disclosure may be applied to an LCoS-based WSS apparatus, for example, an N×N WSS apparatus, an N×L WSS apparatus, or a 1×N WSS apparatus. In this disclosure, it is assumed that the WSS apparatus includes N input ports, and each input port supports M wavelengths, where both N and M are positive integers.

The LCoS device determines, based on a port status of the WSS apparatus, whether port switching has occurred in the WSS apparatus. When no port switching has occurred in the WSS apparatus, the LCoS device starts a process of refreshing an LCoS image. Specifically, the LCoS image refreshes the LCoS image of the WSS apparatus in each time interval, where one time interval is shorter than duration of one image frame. The process of refreshing the LCoS image is described in detail below.

When port switching has occurred in the WSS apparatus, the LCoS device starts a port switching process. When port switching has occurred in the WSS apparatus, the port status information includes information about a port to which switching has occurred (referred to as a switched port), for example, the information that for the optical signal with the first wavelength from the first input port, the first output port is switched to the second output port, where the first input port refers to any one of the N input ports, and the first wavelength is any one of the M wavelengths.

The technical solutions of this disclosure are described by using an example in which switching of one port occurs. When switching of a plurality of ports of the WSS apparatus occurs, a manner of processing of each switched port is the same as that in the case of one switched port.

For clarity and brevity of description, an input port to which port switching occurs is referred to as the first input port below, where the first input port may be any one of the N input ports of the WSS apparatus. As described above, each of the N input ports supports M wavelengths. Therefore, the first input port also supports M wavelengths. It is assumed herein that for an output port for the optical signal with the first wavelength from the first input port, the first output port is to be switched to the second output port. The first output port and the second output port are any two different output ports of the WSS apparatus.

320: The LCoS device updates a sub-image that is of the LCoS image of the WSS apparatus and that corresponds to the optical signal with the first wavelength from the first input port to a first sub-image.

When port switching occurs in the WSS apparatus, a local image of the LCoS image that corresponds to a switched port changes. Specifically, for an optical signal with any wavelength from any input port of the WSS apparatus, when the optical signal is output from different output ports, the optical signal with the wavelength from the input port corresponds to different sub-images of the LCoS image.

For example, when an optical signal with a wavelength $\lambda_K$ from a $m^{th}$ input port of the WSS apparatus is output from an $n^{th}$ output port, the optical signal with the wavelength $\lambda_K$ from the $m^{th}$ input port corresponds to one sub-image (for example, a sub-image 1) of the LCoS image. When for the optical signal with the wavelength $\lambda_K$ from the $m^{th}$ input port, switching to the $p^{th}$ output port for outputting occurs, the optical signal with the wavelength $\lambda_K$ from the $m^{th}$ input port is adjusted to a new sub-image (for example, a sub-image 2) of the LCoS image. The $m^{th}$ input port is any input port of the WSS apparatus, the $n^{th}$ output port and the $p^{th}$ output port are any two different output ports of the WSS apparatus, and $\lambda_K$ is any one of M wavelengths supported by the $m^{th}$ input port, where K is a positive integer, and K≤M.

In other words, for any input port of the WSS apparatus, if for any wavelength, one output port is switched to another output port, a local image of the LCoS image that corresponds to an optical signal with the wavelength from the input port is updated to another sub-image. The correspondence described above may be pre-stored in the LCoS device. When the LCoS device obtains the port status information and determines that switching of a part of ports of the WSS apparatus has occurred, the LCoS device updates, according to the pre-stored correspondence, a sub-image of the LCoS image that corresponds to an optical signal with a specific wavelength from a switched port (namely, an optical signal with a wavelength for which output port switching occurs).

For example, when for the optical signal with the first wavelength from the first input port, the first output port needs to be switched to the second output port for outputting, the LCoS device updates a local image of the LCoS image that corresponds to the optical signal with the first wavelength from the first input port of the WSS apparatus. The updated local image is referred to as the first sub-image.

330: The LCoS device refreshes a driving voltage for a pixel in a first area on the LCoS display screen based on the first sub-image, where the first area includes a first pixel area on the LCoS display screen that corresponds to the first sub-image.

As described above, the first sub-image is a local image of the LCoS image that corresponds to the optical signal with the first wavelength from the first input port.

In addition, for clarity and brevity of description, when the optical signal with the first wavelength from the first input port is output from the second output port, a driving voltage that needs to be loaded to a pixel in a pixel area (for example, the first pixel area below) on the LCoS display screen that corresponds to the first sub-image is referred to as a first driving voltage below.

It should be noted that a driving voltage for each pixel in the first pixel area is referred to as a first driving voltage. However, first driving voltages for different pixels in the first pixel area may be different.

As shown in FIG. 2, pixel areas that correspond to the first LCoS and the second LCoS of the WSS apparatus respectively are divided into N×M areas. Correspondingly, an LCoS image is divided into N×M sub-images, and each sub-image corresponds to one pixel area on the LCoS display screen. A pixel area on the LCoS display screen that corresponds to the first sub-image is referred to as the first pixel area.

It can be learned from the principle of light beam deflection performed by the LCoS that for the optical signal with the first wavelength from the first input port, the first output port is switched to the second output port for outputting, and a driving voltage for the pixel in the first pixel area also changes accordingly. The driving voltage that needs to be loaded to the pixel in a first pixel area, namely, the first driving voltage, may be obtained through calculation based on image data of the first sub-image, when the optical signal with the first wavelength from the first input port is output from the second output port.

In different embodiments of this disclosure, the first area in step 330 refers to different pixel areas on the LCoS display screen.

For example, in an implementation, the first area is a pixel area on the LCoS display screen that corresponds to the optical signal with the first wavelength from the first input port, namely, the first pixel area in this specification.

In another implementation, the first area is a pixel area on the LCoS display screen that corresponds to the first input port. In this case, the size of the first area is greater than the size of the first pixel area.

In still another implementation, the first area is pixel areas on the LCoS display screen that correspond to optical signals with the first wavelength from the N input ports of the WSS apparatus. In this case, the size of the first area is greater than the size of the first pixel area.

It should be understood that the size of the first area being greater than the size of the first pixel area means that a quantity of pixels included in the first area is greater than a quantity of pixels in the first pixel area.

The foregoing different implementations are described in detail below.

340: The LCoS device refreshes a driving voltage for a pixel in another area on the LCoS display screen that is not the first area.

After preferentially refreshing the driving voltage for the pixel in the first area on the LCoS display screen, the LCoS device then refreshes the driving voltage for the pixel in the another area on the LCoS display screen that is not the first area.

With reference to step 330 and step 340, after port switching occurs in the WSS apparatus, the LCoS device preferentially refreshes the driving voltage for pixel in the first area on the LCoS display screen, and then refreshes the driving voltage for the pixel in the another area other than the first area, thereby completing refreshing of a driving voltage for a pixel on the LOCS display screen.

A process of refreshing a driving voltage for a pixel on the LCoS display screen in each of the several different cases of the first area mentioned above is described below.

In this disclosure, after port switching occurs, a driving voltage for a pixel on the LCoS display screen is refreshed based on a priority.

To refresh a driving voltage for a pixel on the LCoS display screen based on a priority, the LCoS device maintains one pixel refresh queue. For example, in an implementation, before port switching occurs in the WSS apparatus, the LCoS device generates an initial pixel refresh queue, where the pixel refresh queue includes a driving voltage for a pixel on the LCoS display screen that corresponds to the N input ports of the WSS apparatus. The LCoS device refreshes, based on a correspondence between each driving voltage in the pixel refresh queue and a pixel on the LCoS display screen, a driving voltage for each pixel on the LCoS display screen, thereby driving the liquid crystal of the LCoS display screen to work.

After switching of the output port for the optical signal with the first wavelength from the first input port occurs, the sub-image that is of the LCoS image and that corresponds to the optical signal with the first wavelength from the first input port is updated to a new sub-image. For example, the new sub-image is the first sub-image. The LCoS device calculates, based on the image data of the first sub-image, the driving voltage (denoted as the first driving voltage) for the pixel in the first pixel area on the LCoS display screen that corresponds to the first sub-image, and updates the driving voltage for the pixel that is in the first pixel area and that is included in the pixel refresh queue to the driving voltage obtained through calculation based on the image data of the first sub-image, that is, to the first driving voltage. Then, by updating the driving voltage for the pixel in the first pixel area to the driving voltage obtained through calculation based on the image data of the first sub-image, the LCoS device drives the liquid crystal for the pixel in the first pixel area to work.

Optionally, in addition to the driving voltage for the pixel on the LCoS display screen that corresponds to the N input ports of the WSS apparatus, the pixel refresh queue further includes a pixel number of a pixel on the LCoS display screen that corresponds to each port of the WSS apparatus. Each pixel number has a corresponding priority in the pixel refresh queue, and the priority of each pixel number is the same as the priority of refreshing the driving voltage for the pixel corresponding to the pixel number. Alternatively, in other words, the priority of each pixel number in the pixel refresh queue indicates a priority of refreshing a driving voltage for a pixel corresponding to each pixel number.

After port switching occurs, the LCoS device adjusts priorities of a part of pixel numbers to higher priorities than a priority of another pixel number, and refreshes, based on an adjusted priority of each pixel number, from high to low, the driving voltage for the pixel corresponding to each pixel number, thereby refreshing a driving voltage for a pixel based on a priority.

(1) The First Area is the First Pixel Area.

In this implementation, when switching of the output port for the optical signal with the first wavelength from the first input port occurs, the LCoS device adjusts a priority of a pixel number, included in the pixel refresh queue, of a pixel in the first pixel area on the LCoS display screen that corresponds to the optical signal with the first wavelength from the first input port to a higher priority than a priority of a pixel number of another pixel on the LCoS display screen. Then, the LCoS device refreshes the driving voltage for the pixel on the LCoS display screen based on the adjusted priority of the pixel number in the pixel refresh queue.

As the priority of the pixel number of the pixel in the first pixel area is adjusted to a highest priority, the driving voltage for the pixel in the first pixel area on the LCoS display screen is refreshed preferentially. A pixel on the LCoS display screen that is not in the first pixel area is refreshed based on an adjusted priority of a corresponding pixel number in the pixel refresh queue.

Refer to FIG. 4. FIG. 4 is an example of the first area on the LCoS display screen according to this disclosure. As shown in FIG. 4, the WSS apparatus includes five input ports, and each input port supports seven wavelengths. It is assumed that switching of an output port for an optical signal with the fifth wavelength from the third input port of the WSS apparatus occurs. In this case, the LCoS device may preferentially refresh a driving voltage for a pixel in an area (for example, the first pixel area in FIG. 4) on the LCoS display screen that corresponds to the optical signal with the fifth wavelength from the third input port, and then refresh a driving voltage for a pixel in another area. Specifically, a sequence of refreshing the driving voltage for the pixel in the another area depends on an adjusted priority of each pixel number in the pixel refresh queue. Details are not described again.

In this implementation, the first area is the first pixel area. Specifically, the first area is an area including pixels that are in a plurality of rows and corresponding columns in the pixel array and that correspond to the first input port, and the corresponding columns are a plurality of columns that are in the plurality of rows and that correspond to the first wavelength.

This manner of refreshing a driving voltage for a pixel on the LCoS display screen may be specifically implemented by using a solution of addressing provided in FIG. 9 and FIG. 10 below.

(2) The First Area is the Pixel Area on the LCoS Display Screen that Corresponds to the First Input Port.

In this implementation, when switching of the output port for the optical signal with the first wavelength from the first input port occurs, the LCoS device adjusts a priority of a pixel number, included in the pixel refresh queue, of a pixel in a pixel area on the LCoS display screen that corresponds to the first input port to a higher priority than a priority of a pixel number of a pixel on the LCoS display screen that corresponds to other (N−1) input ports of the WSS apparatus. The pixel area on the LCoS display screen that corresponds to the first input port is defined as the first area, that is, the first area is the pixel area on the LCoS display screen that corresponds to optical signals with M wavelengths from the first input port. Then, the LCoS device refreshes the driving voltage for the pixel on the LCoS display screen based on the adjusted priority of the pixel number in the pixel refresh queue.

As the priority of the pixel number of the pixel in the first area on the LCoS display screen that corresponds to the first input port is adjusted to a highest priority, a driving voltage for the pixel in the first area on the LCoS display screen is refreshed preferentially. A pixel on the LCoS display screen that is not in the first area is refreshed based on an adjusted priority of a corresponding pixel number in the pixel refresh queue.

Figure 5:
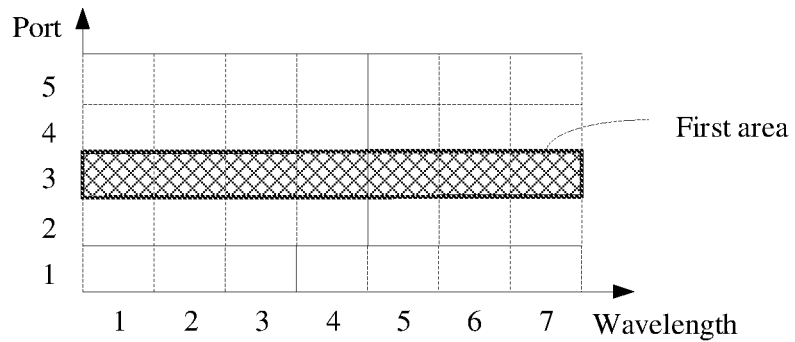
FIG. 5 is another example of a first area on an LCoS display screen according to this disclosure.

Refer to FIG. 5. FIG. 5 is another example of the first area on the LCoS display screen according to this disclosure. As shown in FIG. 5, the WSS apparatus includes five input ports, and each input port supports seven wavelengths. It is assumed that switching of an output port for an optical signal with the fifth wavelength from the third input port of the WSS apparatus occurs. In this case, the LCoS device may preferentially refresh a driving voltage for a pixel in an area (for example, the first area in FIG. 5) on the LCoS display screen that corresponds to the third input port, and then refresh a driving voltage for a pixel in another area. Specifically, a sequence of refreshing the driving voltage for the pixel in the another area depends on an adjusted priority of each pixel number in the pixel refresh queue. Details are not described again.

In this implementation, a size of the first area is greater than a size of the first pixel area. The first area is specifically an area including all pixels that are in a plurality of rows in the pixel array of the LCoS display screen and that correspond to the first input port.

This manner of refreshing a driving voltage for a pixel on the LCoS display screen may be specifically implemented by using a solution of addressing provided in FIG. 11 below.

(3) The First Area is Pixel Areas on the LCoS Display Screen that Correspond to Optical Signals with the First Wavelength from the N Input Ports of the WSS Apparatus.

In this implementation, when switching of the output port for the optical signal with the first wavelength from the first input port occurs, the LCoS device adjusts a priority of a pixel number, included in the pixel refresh queue, of a pixel in a first area on the LCoS display screen that corresponds to an optical signal with the first wavelength from the N input ports of the WSS apparatus to a higher priority than a priority of a pixel number of a pixel on the LCoS display screen that corresponds to optical signals with other wavelengths (that specifically are the remaining M−1 wavelengths) from the N input ports of the WSS apparatus. The pixel areas on the LCoS display screen that each correspond to an optical signal with the first wavelength from each of the N input ports are collectively defined as the first area.

Then, the LCoS device refreshes the driving voltage for the pixel on the LCoS display screen based on the adjusted priority of the pixel number in the pixel refresh queue. As the priority of the pixel number of the pixel in the first area on the LCoS display screen that corresponds to the optical signal with the first wavelength from the N input ports is adjusted to a highest priority, a driving voltage for the pixel in the first area on the LCoS display screen is refreshed preferentially. A pixel on the LCoS display screen that is not in the first area is refreshed based on an adjusted priority of a corresponding pixel number in the pixel refresh queue.

Figure 6:
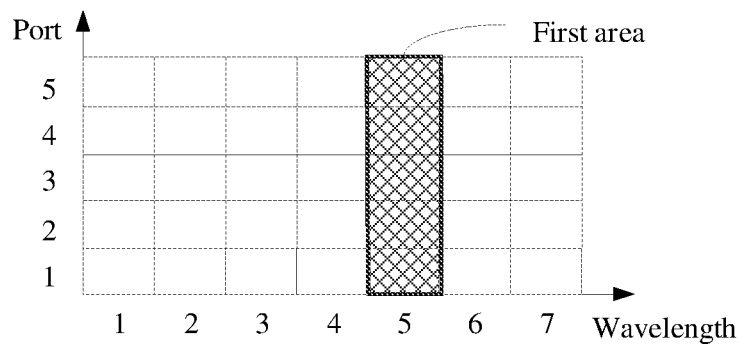
FIG. 6 is still another example of a first area on an LCoS display screen according to this disclosure.

Refer to FIG. 6. FIG. 6 is still another example of the first area on the LCoS display screen according to this disclosure. As shown in FIG. 6, the WSS apparatus includes five input ports, and each input port supports seven wavelengths. It is assumed that switching of an output port for an optical signal with the fifth wavelength from the third input port of the WSS apparatus occurs. In this case, the LCoS device may preferentially refresh a driving voltage for a pixel in an area (for example, the first area in FIG. 6) on the LCoS display screen that corresponds to the fifth wavelength from each input port, and then refresh a driving voltage for a pixel in another area. Specifically, a sequence of refreshing the driving voltage for the pixel in the another area depends on an adjusted priority of each pixel number in the pixel refresh queue. Details are not described again.

In this implementation, a size of the first area is greater than a size of the first pixel area. The first area is specifically an area including all pixels that are in a plurality of columns in the pixel array of the LCoS display screen and that correspond to an optical signal with the first wavelength of all input ports (namely, the N input ports) of the WSS apparatus.

This manner of refreshing a driving voltage for a pixel on the LCoS display screen may be specifically implemented with a solution of addressing provided in FIG. 12 below.

It can be learned that in the refreshing manner (1), the first area is actually the first pixel area, that is, the pixel area on the LCoS display screen that corresponds to the optical signal with the first wavelength from the first input port.

However, in both the refreshing manner (2) and the refreshing manner (3), the first area is greater than the first pixel area.

Specifically, in the refreshing manner (2), in addition to the first pixel area, the first area further includes a pixel area on the LCoS display screen that corresponds to an optical signal with another wavelength (that specifically includes remaining M−1 wavelengths other than the first wavelength) from the first input port.

In the refreshing manner (3), in addition to the first pixel area, the first area further includes a pixel area on the LCoS display screen that corresponds to an optical signal with the first wavelength from another input port in the N input ports of the WSS apparatus that is not the first input port.

In the foregoing refreshing manners (2) and (3), as the driving voltage for the pixel in the first area is refreshed preferentially, and then the driving voltage for the pixel in the another area other than the first area is refreshed, compared with refreshing the entire LCoS display screen in a fixed sequence of pixel numbers, a waiting time can be reduced, and port switching becomes faster.

Optionally, the LCoS device may alternatively use another refreshing manner other than the foregoing three refreshing manners.

For example, the LCoS device preferentially refreshes a driving voltage for a pixel in the first pixel area, and after the driving voltage for the pixel in the first pixel area is refreshed, refreshes a driving voltage for a pixel in a pixel area on the LCoS display screen that corresponds to the optical signals with the other (M−1) wavelengths from the first input port. That is, a priority of refreshing the driving voltage for the pixel in the first pixel area on the LCoS display screen that corresponds to the optical signal with the first wavelength to which switching has occurred from the first input port, is higher than a priority of refreshing a driving voltage for a pixel in a pixel area on the LCoS display screen that corresponds to an optical signal with another wavelength to which no switching has occurred from the first input port.

Further, after refreshing the driving voltage for the pixel in the pixel area on the LCoS display screen that corresponds to the optical signals with the first wavelength and the another wavelength from the first input port, the LCoS device refreshes a driving voltage for a pixel in a pixel area on the LCoS display screen that corresponds to the other (N−1) input ports other than the first input port.

For example, in a refreshing manner, after refreshing the first pixel area corresponding to the first wavelength from the first input port, the LCoS device then refreshes the pixel area on the LCoS display screen that corresponds to the optical signal with the another wavelength from the first input port. After all pixel areas on the LCoS display screen that correspond to the first input port are refreshed, a pixel area on the LCoS display screen that corresponds to the another input port of the WSS apparatus that is not the first input port are refreshed.

For example, the LCoS display screen is divided into 50 pixel areas, and sequential numbers of the pixel areas are 1 to 50. According to an existing solution, the pixel areas are refreshed in an ascending sequence of the numbers, starting from a pixel area numbered 1 and ending with a pixel area numbered 50. In each pixel area, pixels are refreshed in an ascending sequence of numbers of the pixels. However, in an embodiment provided in this disclosure, it is assumed that the pixel area corresponding to the first input port includes pixel areas numbered 21 to 25. The first pixel area is a pixel area numbered 23. After refreshing starts, the LCoS device preferentially refreshes a driving voltage for a pixel in the pixel area numbered 23, and then refreshes driving voltages for pixels in pixel areas numbered 21, 22, 24, and 25 sequentially. Then, the LCoS device continues to refresh a pixel area with the next number to number 25, that is, a pixel area numbered 26. Inside each pixel area, the LCoS device may preform refreshing in an ascending sequence of the pixel numbers.

For another example, the LCoS display screen is divided into 50 pixel areas, and sequential numbers of the pixel areas are 1 to 50. It is assumed that the first input port corresponds to pixel areas numbered 21 to 25 on the LCoS display screen. The first pixel area is a pixel area numbered 23. After refreshing starts, the LCoS device preferentially refreshes a driving voltage for a pixel in the pixel area numbered 23, and then refreshes driving voltages for pixels in pixel areas numbered 21, 22, 24, and 25 sequentially. Then, the LCoS device returns to a pixel area numbered 1, and continue to perform refreshing sequentially. After a driving voltage for a pixel in a pixel area numbered 20 is refreshed, the pixel areas numbered 21 to 25 are skipped, and a driving voltage for a pixel in a pixel area numbered 26 is refreshed. After the driving voltage for the pixel in the pixel area numbered 26 is refreshed, driving voltages for pixels in a pixel area numbered 27 and a pixel area after the pixel area numbered 27 continue to be refreshed sequentially. Inside each pixel area, the LCoS device may preform refreshing in an ascending sequence of the pixel numbers.

It can be learned from the procedure shown in FIG. 3 that, in this disclosure, when port switching occurs in the WSS apparatus, in comparison, a priority of refreshing a driving voltage for a pixel on the LCoS display screen that corresponds to a switched port is higher than a priority of refreshing a driving voltage for a pixel on the LCoS display screen that corresponds to a port to which no switching has occurred. In other words, the LCoS device preferentially refreshes the driving voltage for the pixel in the pixel area that corresponds to the switched port. This helps to achieve faster port switching, compared with refreshing driving voltages for pixels on an LCoS display screen in a fixed sequence of pixel numbers (for example, refreshing in an ascending sequence of numbers of pixels on an LCoS display screen).

Figure 7:
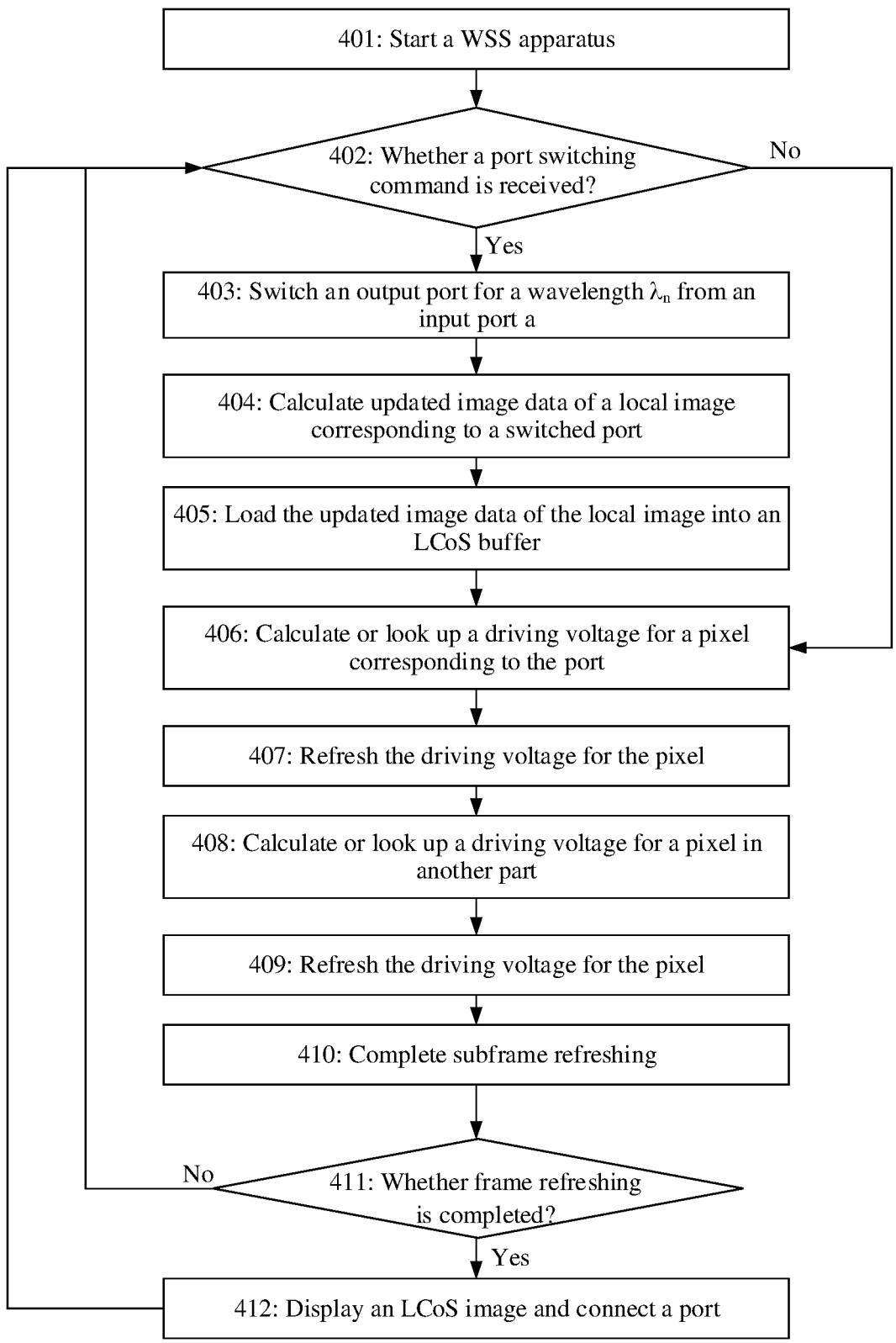
FIG. 7 is a flowchart of a method of pixel refreshing during port switching according to this disclosure.

Refer to FIG. 7. FIG. 7 is a flowchart of a method of refreshing a pixel voltage during port switching according to this disclosure.

401: Start a WSS apparatus.

402: An LCoS device determines whether a port switching command is received.

If the LCoS device has not received the port switching command, step 406 is performed to start a process of refreshing an LCoS image. If the LCoS device has received the port switching command, step 403 is performed to start a port switching process. Descriptions are separately provided below.

It should be noted that "frame" in this disclosure refers to a single image that is the smallest unit in the field of images. One frame is one still picture, and successive frames become animations, such as television images. Frame rate refers to a quantity of frames or images displayed per second.

(1) The Process of Refreshing an LCoS Image.

Generally, images are refreshed frame by frame, and a frame rate is 60 Hz. However, in this embodiment of this disclosure, in a process of refreshing an LCoS image, one frame is divided into smaller units for refreshing. The smaller units are referred to as "time intervals" in this disclosure.

Specifically, the LCoS device refreshes an LCoS image in each "time interval".

It can be understood that, compared with a "frame", duration of one "time interval" is shorter than duration of one image frame. Therefore, in this embodiment, a time interval may also be referred to as a "subframe". That is, one frame is divided into a plurality of subframes for refreshing. In the process of refreshing, driving voltages for pixels on the LCoS display screen are refreshed in a specific sequence of pixel numbers.

For example, the LCoS device refreshes the driving voltage for the pixel on the LCoS display screen based on a pixel refresh queue. In an implementation, the pixel refresh queue includes a pixel number of a pixel on the LCoS display screen that corresponds to each input port of the WSS apparatus, and a priority of each pixel number in the pixel refresh queue corresponds to a priority of refreshing a driving voltage for a pixel corresponding to the pixel number. In other words, a priority of a pixel number in the pixel refresh queue represents a priority of refreshing a driving voltage for a pixel corresponding to the pixel number relative to that of a driving voltage for another pixel on the LCoS display screen.

Optionally, in an implementation, the pixel refresh queue in this specification may include only a pixel number for a pixel on the LCoS display screen. To be specific, the pixel refresh queue includes a pixel number of the pixel on the LCoS display screen that corresponds to the N input ports of the WSS apparatus, and a priority of each pixel number in the pixel refresh queue indicates a priority of refreshing a driving voltage for a pixel corresponding to the pixel number.

The LCoS device refreshes the driving voltage for the pixel on the LCoS display screen based on a priority of each pixel number in the pixel refresh queue. For the pixel refresh queue, an initial sequence of pixel numbers is an ascending sequence. If port switching has never occurred, the LCoS device performs refreshing in an ascending sequence of pixel numbers. If port switching has occurred, a pixel on the LCoS display screen that corresponds to a port to which switching has occurred has a higher priority of refreshing than that of another pixel. In this case, the priority of refreshing the driving voltage for the pixel corresponding to each pixel number in the pixel refresh queue is ranked by using a pixel number of the pixel in a pixel area corresponding to the port to which switching has occurred and a pixel number of a pixel in another part of pixel area (that corresponds to a port to which no switching has occurred). The pixel number of the pixel in the pixel area corresponding to the port to which switching has occurred is of higher priority.

For example, it is assumed that a priority of a pixel number ranked at the front of the pixel refresh queue is higher than a priority of a pixel number ranked at the back, and a priority becomes lower sequentially from the front to the back. In this case, in the pixel refresh queue, the pixel number for the pixel in the pixel area corresponding to the port to which switching has occurred is at the front of the pixel refresh queue, and the pixel number for the pixel in the pixel area corresponding to the port to which no switching has occurred comes after the pixel number for the pixel in the pixel area corresponding to the switched port.

For example, when switching of an output port for an optical signal with the first wavelength from a $m^{th}$ input port in the N input ports of the WSS apparatus occurs, the LCoS device may first adjust a priority of a pixel number, in the pixel refresh queue, of a pixel that corresponds to the optical signal with the first wavelength from the $m^{th}$ input port to a higher priority than a priority of a pixel number of another pixel. Then, a driving voltage for a pixel on the LCoS display screen is refreshed based on the adjusted priority of the pixel number in the pixel refresh queue.

For example, it is assumed that the WSS apparatus includes 10 input ports, each input port supports 50 wavelengths, a size of a pixel array is 2000×1000, and the pixel refresh queue includes 100 pixels. Each wavelength from each input port corresponds to a pixel sub-block of 200×20 in the pixel array.

In the pixel refresh queue, pixel numbers of pixels corresponding to the 10 input ports are sorted in an ascending sequence, and priorities of the pixel numbers become lower sequentially from the head to the end of the queue.

It is assumed that switching of an output port for an optical signal with the fifth wavelength from the third input port occurs. In this case, a priority of a pixel number of a pixel on the LCoS display screen that corresponds to the optical signal with the fifth wavelength from the third input port is adjusted to a higher priority than a priority of a pixel number of another pixel on the LCoS display screen. That is, pixel numbers ranging from 416001 to 420000 are adjusted to the front of the pixel refresh queue, indicating that priorities of the pixel numbers in the range are higher than a priority of another pixel number. In a process of refreshing a pixel driving voltage, driving voltages for pixels on the LCoS display screen whose pixel numbers are 416001 to 420000 are refreshed preferentially, and then driving voltages for pixels whose pixel numbers are 1 to 416000 and whose pixel numbers are 420001 to 2000000 are refreshed.

Optionally, in another example, the LCoS device may alternatively not adjust a priority ranking of the pixel number in the pixel refresh queue of the pixel corresponding to the switched port, but after determining a range of the pixel number on the LCoS display screen that corresponds to the switched port, refreshes a driving voltage for the pixel on the LCoS display screen that corresponds to the switched port directly, and then refreshes a driving voltage for another pixel.

Further, inside the switched port, a priority of refreshing a driving voltage for a pixel in a pixel area on the LCoS display screen that corresponds to an optical signal with a switched wavelength is higher than that of a driving voltage for a pixel in a pixel area on the LCoS display screen that corresponds to an optical signal with a wavelength to which no switching has occurred.

For example, a first input port supports a total of M wavelengths, and switching of an output port for a first wavelength occurs. In this case, in a process of refreshing a driving voltage for a pixel in a pixel area corresponding to the first input port, a driving voltage for a pixel in a pixel area (namely, in a first pixel area) corresponding to the first wavelength from the first input port is refreshed preferentially, and then a driving voltage for a pixel in a pixel area corresponding to optical signals with other (M−1) wavelengths from the first input port are refreshed.

406: The LCoS device calculates or looks up a driving voltage for a pixel corresponding to a port.

407: The LCoS device refreshes the driving voltage for the pixel.

In step 406, the driving voltage for the pixel corresponding to the port is calculated or looked up at first. If buffered image data changes, the driving voltage for the pixel in a pixel area corresponding to the changed image data needs to be recalculated. If the buffered image data has not changed, the driving voltage for the pixel may be looked up directly, and the driving voltage for the pixel is refreshed in step 407.

408: The LCoS device calculates or looks up a driving voltage for a pixel in another part.

409: The LCoS device refreshes the driving voltage for the pixel in the another part.

In step 408, the LCoS device first calculates or looks up the driving voltage for the pixel corresponding to the port. If image data buffered in the LCoS device changes, the driving voltage for the pixel in a pixel area corresponding to the changed image data needs to be recalculated. If the image data buffered in the LCoS device has not changed, the LCoS device may look up the driving voltage for the pixel directly, and refresh the driving voltage for the pixel in step 409.

410: Complete subframe refreshing.

After the subframe refreshing is completed, step 411 is performed to determine whether frame refreshing is completed.

411: The LCoS device determines whether frame refreshing is completed.

If no, step 402 is performed again to determine whether the port switching command is received. If yes, step 412 is performed to complete image display, and a port is connected.

After the port is connected, step 402 is performed again, and the process is repeated.

412: Display an LCoS image and connect a port.

(2) Port Switching Process.

In step 402 described above, the LCoS device determines whether the port switching command is received. If yes, step 403 is performed to start a port switching process.

403: The LCoS device obtains a status and a number of a switched port according to the port switching command.

For example, the port switching command is used to instruct a switch to an output port b for outputting for an optical signal with a wavelength $\lambda_n$ from an input port a.

404: When switching of a port of the LCoS device occurs, calculate updated image data of a local image of the LCoS image that corresponds to a switched port.

It should be noted that, in a case of port switching, only a local image of the LCoS image changes, and in step 404, only the changed image data of the local image is calculated, but image data of the whole LCoS image is not calculated.

405: The LCoS device stores the updated image data of the local image into an LCoS buffer.

Subsequently, the LCoS device performs step 406 and a subsequent step based on the updated (that is, changed) image data of the local image and the pixel refresh queue, to finally complete the frame refreshing process and display of the LCoS image. Finally, the port is connected, that is, port switching is completed. For the optical signal with the wavelength $\lambda_n$ from the input port a, there is the switch to the output port b for outputting.

Figure 8:
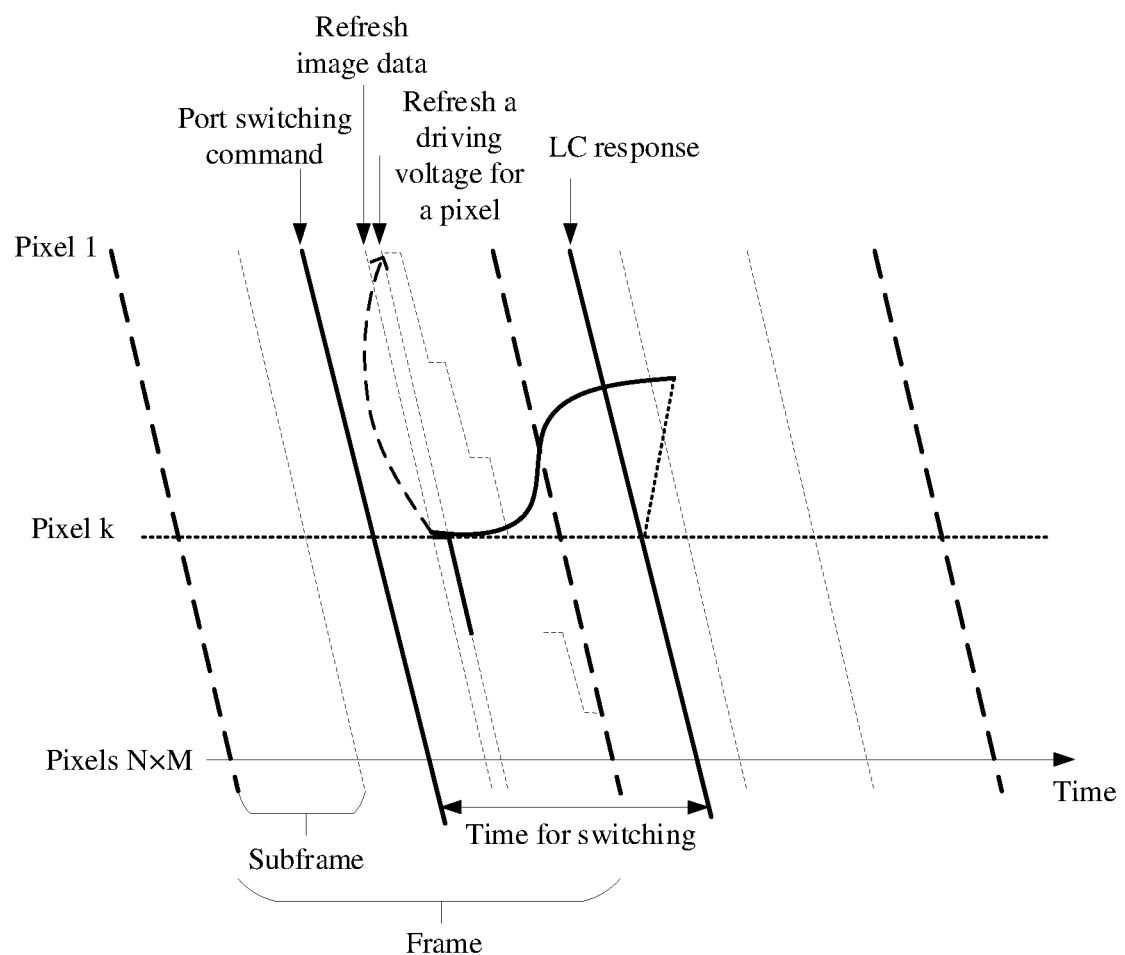
FIG. 8 is a schematic diagram of a time sequence of refreshing a pixel driving voltage of a circuit module of an LCoS according to this disclosure.

To achieve a fast WSS and a fast refreshing process of the WSS, an existing LCoS and a circuit module of the LCoS needs to be improved. FIG. 8 is a schematic diagram of a time sequence of refreshing a pixel driving voltage of a circuit module of an LCoS according to this disclosure.

It can be learned from FIG. 8 that, in the technical solutions of this disclosure, two different driving methods are used.

One driving method is to refresh image data of a local image based on a time interval (or a subframe), where one time interval is shorter than duration corresponding to one image frame. In WSS applications, usually, port switching is suddenly required, and only individual ports need a switch. Therefore, only a local image of the LCoS image that corresponds to a switched port changes. For a change of a local image that occurs at any time, it is assumed that the change occurs within a time interval (j−1), image data of the changed local image is processed within the time interval j, to complete refreshing of the image data.

Another driving method is to refresh a driving voltage for a pixel based on a priority, rather than in a fixed sequence of pixel numbers. Specifically, for a local image corresponding to a port to which switching has occurred, after image data of the local image is updated, updated image data of the local image is converted into a voltage signal. In a process of refreshing a pixel driving voltage, a driving voltage for a pixel in a pixel area on the LCoS display screen that corresponds to the local image is refreshed preferentially, and then a driving voltage for a pixel in another pixel area is refreshed. As shown in FIG. 8, when refreshing of the driving voltage for the pixel in the pixel area corresponding to the local image is completed, liquid crystal corresponding to the pixel area corresponding to the local image starts to respond. A response time of the liquid crystal depends on a change value of a voltage (or an electric field) applied to the liquid crystal.

One pixel in the pixel area corresponding to the local image is used as an example. It is assumed that a pixel number of the pixel is k. In this case, a corresponding time for switching $t_{SW}$ is shown in a formula (1):

$$t_{SW,k} = T_{subFRM,i} - T_{UPD} + k \times t_{PIX} + t_{LC,k} \quad (1)$$

$T_{subFRM,i}$ is a start time of a current subframe i, frame duration $t_{subFRM}$ is $T_{subFRM,i} - T_{subFRM,i-1}$, and a quantity of pixels corresponding to the image data of the local image is $N_a \times M_a$.

Correspondingly, a longest time for switching is shown in formula (2):

$$t_{SW-MAX} = t_{SubFRM} + N_a \times M_a \times t_{PIX} + t_{LC-MAX} \quad (2)$$

For example, it is assumed that a frame rate is 60 Hz, that is, frame duration $t_{FRM}$ is about 15 ms. If one frame is divided into three subframes, subframe duration $t_{SubFRM}$ is about 5 ms. The quantity of the pixels corresponding to the image data of the local image is $N_a = 200 \times M_a = 10$, with duration $t_{PIX} = 2.5$ ns for completing refreshing of a voltage of one pixel and longest duration $t_{LC-MAX} = 10$ ms for the liquid crystal to respond. In this case, a calculated maximum time for switching $t_{SW-MAX}$ is about 15 ms.

An LCoS circuit module provided in this disclosure is described below.

Figure 9:
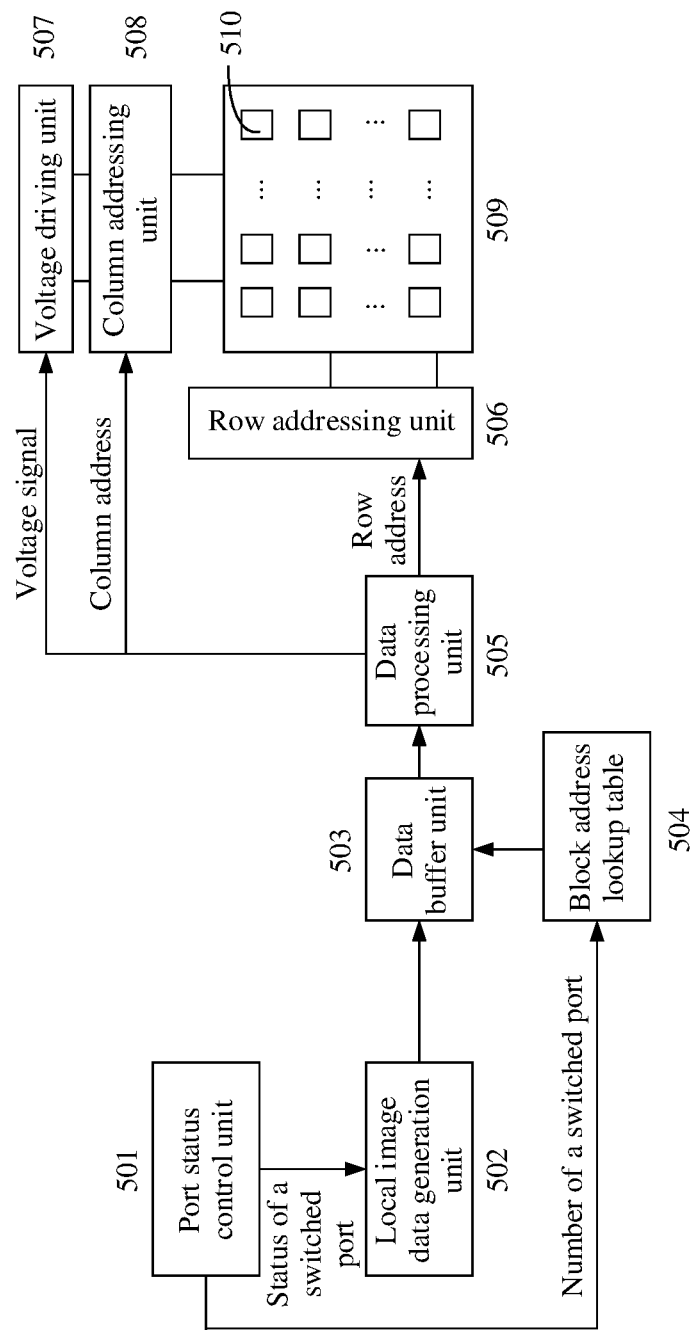
FIG. 9 is an example of an LCoS circuit module according to this disclosure.

Refer to FIG. 9. FIG. 9 is an example of an LCoS circuit module according to this disclosure. As shown in FIG. 9, the LCoS circuit module includes the following units: a port status control unit (501), a local image data generation unit (502), a data buffer unit (503), a block address lookup table (504), a data processing unit (505), a row addressing unit (506), a voltage driving unit (507), a column addressing unit (508), and a pixel array unit (509). The pixel array unit (509) includes a plurality of rows of and a plurality of columns of pixels, for example, pixels (510) shown in FIG. 9. Optionally, these units may be collectively integrated into a single silicon chip, or may be separately implemented in a plurality of silicon chips or board-level circuits.

It should be understood that a function of the LCoS circuit module is to convert image data that is output from the port status control unit (501) and that corresponds to a port to which switching has occurred into driving voltages for the pixels (510) in the pixel array unit (509), so as to drive the liquid crystal of the LCoS display screen to work.

For brevity, a port to which switching has occurred is referred to as a switched port for short below.

When the WSS apparatus is working, when receiving an instruction of switching one port or several ports, the port status control unit (501) transmits a port status of the switched port to the local image data generation unit (502), and transmits a port number of the switched port to the block address lookup table (504). The local image data generation unit (502) generates updated image data of a local image corresponding to the switched port based on the port status of the switched port, and transmits the image data to the data buffer unit (503). The block address lookup table (504) looks up, based on the port number of the switched port, a pixel number corresponding to the updated image data of the local image, and transmits the pixel number to the data buffer unit (503).

Further, the data processing unit (505) extracts, in each time interval, the updated image data of the local image and the pixel number from the data buffer unit (503), and performs data processing.

Figure 10:
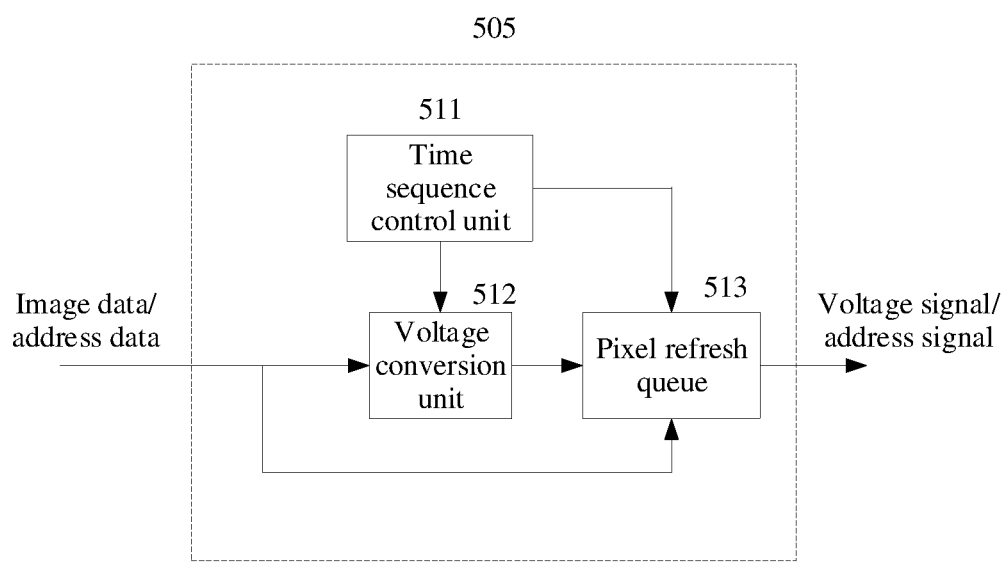
FIG. 10 is a schematic diagram of internal implementation of a data processing unit of an LCoS circuit module.

For example, modules inside the data processing unit (505) are shown in FIG. 10. FIG. 10 is a schematic diagram of internal implementation of the data processing unit of the LCoS circuit module.

As shown in FIG. 10, the data processing unit (505) mainly includes a time sequence control unit (511), a voltage conversion module (512), and a pixel refresh queue (513). The front of the pixel refresh queue is voltage signal data converted from the updated image data of the local image and the corresponding pixel number. The back of the pixel refresh queue is voltage signal data converted from other local image data that has changed in a last frame and a corresponding pixel number. Specifically, the pixel refresh queue has a sequence from the latest to the earliest based on a time at which port switching occurs, where pixels corresponding to a same port are ranked in an ascending sequence of pixel numbers.

The voltage conversion module (512) converts image data into a voltage signal, and adds the signal in the pixel refresh queue (513). The time sequence control unit (511) controls the voltage conversion module (512) and the pixel refresh queue (513) to output, based on a subframe rate, a voltage signal and an address signal that correspond to each pixel.

Further, the data processing unit (505) transmits a row address and a column address that are in the pixel array unit (509) and that correspond to a pixel number to the row addressing unit (506) and the column addressing unit (508) respectively, to perform addressing and enable writing. The data transmission unit (505) transmits a corresponding voltage signal to the voltage driving unit (507), and the voltage driving unit (507) loads the voltage signal to the corresponding pixel (510) in the pixel array unit (509), so as to complete refreshing of a driving voltage for each pixel.

It can be learned that, in the process of refreshing a driving voltage for a pixel shown in FIG. 9, the LCoS circuit module obtains a row address and a column address in the pixel array of the LCoS display screen that correspond to a changed local image. Therefore, when performing addressing in the pixel array, the LCoS circuit module can accurately determine a driving voltage for which pixel needs to be refreshed preferentially.

An example of a process of refreshing a pixel driving voltage shown in FIG. 9 is used for description.

For example, it is assumed that the pixel array unit (509) includes 2000×1000 pixels, the WSS apparatus has N ports, where N=10, and each port supports M wavelength paths, where M=50. In this case, an optical signal with each wavelength corresponds to a pixel area including 200×20 pixels in the pixel array unit (509) of the LCoS display screen. As shown in FIG. 2, pixel numbers of pixels are sorted in an ascending sequence from lower left to upper right. For the pixel array unit (509), row numbers are sorted in an ascending sequence from bottom to top, and column numbers are sorted in an ascending sequence from left to right.

After the LCoS circuit module is enabled, an initial pixel refresh queue (513) is sorted in an ascending sequence of pixel numbers. The LCoS circuit module calculates or looks up a driving voltage for a pixel based on a subframe rate, and performs updating. In addition, whether a port switching command is received is monitored based on the subframe rate.

When receiving the port switching command, for example, to switch an output port for an optical signal with the fifth wavelength from the third input port of the WSS apparatus, the port status control unit (501) waits for a last subframe to complete. As a current subframe comes, the port switching command is monitored, and refreshing is performed in the current subframe. First, a corresponding local image of an LCoS image is calculated, image data of the local image is loaded into an LCoS buffer, for example, a data buffer unit (503) in FIG. 6, and then the pixel refresh queue is sorted based on a priority. Because there is a switch of the output port for the optical signal with the fifth wavelength from the third input port, and a pixel in a pixel area (including pixel numbers ranging from 416001 to 420000) in the pixel array unit (509) that corresponds to the image data of the optical signal with the fifth wavelength from the third input port is at the front of the pixel refresh queue, at the back, pixel numbers are sorted from 1 to 416000 and from 420001 to 2000000. The driving voltage for each pixel is calculated or looked up and the refreshing is performed according to a sequence given in the pixel refresh queue.

It should be understood that the WSS apparatus includes 10 input ports, each input port supports 50 wavelengths, and the pixel array unit (509) includes 2000×1000 pixels. According to a correspondence between an LCoS image and the pixel array unit (509), each input port corresponds to 200 rows in the pixel array unit (509), and an optical signal with each wavelength corresponds to 20 columns in the pixel array unit (509). It should be understood that the input port may alternatively correspond to a column in the pixel array unit (709), and the optical signal with each wavelength may alternatively correspond to a row in the pixel array unit (709). This is not limited in this disclosure.

As in the example given above, when switching of the output port for the optical signal with the fifth wavelength from the third input port occurs, the LCoS device preferentially refreshes, in the manner (1) of refreshing a pixel driving voltage in step 340 in FIG. 3, a pixel area (namely, a first pixel area) in the pixel array unit (509) that corresponds to the optical signal with the fifth wavelength from the third input port. Specifically, the first pixel area is an area including pixels in the $401^{st}$ to $600^{th}$ rows and the $81^{st}$ to $100^{th}$ columns in the pixel array unit (509). In this example, the first pixel area and a first area are the same.

It can be learned that, compared with an existing solution of refreshing global image data based on a frame rate, refreshing local image data based on a subframe rate reduces a waiting time and reduces the computation load. In addition, compared with an existing solution of refreshing a pixel driving voltage in a fixed sequence of pixels, refreshing a pixel driving voltage based on a priority reduces a waiting time, thereby implementing fast port switching in the WSS apparatus.

In addition, in the technical solutions of this disclosure, duration of refreshing the pixel driving voltage may be decoupled from a pixel resolution, and may be decoupled from a subframe rate or a frame rate.

Figure 11:
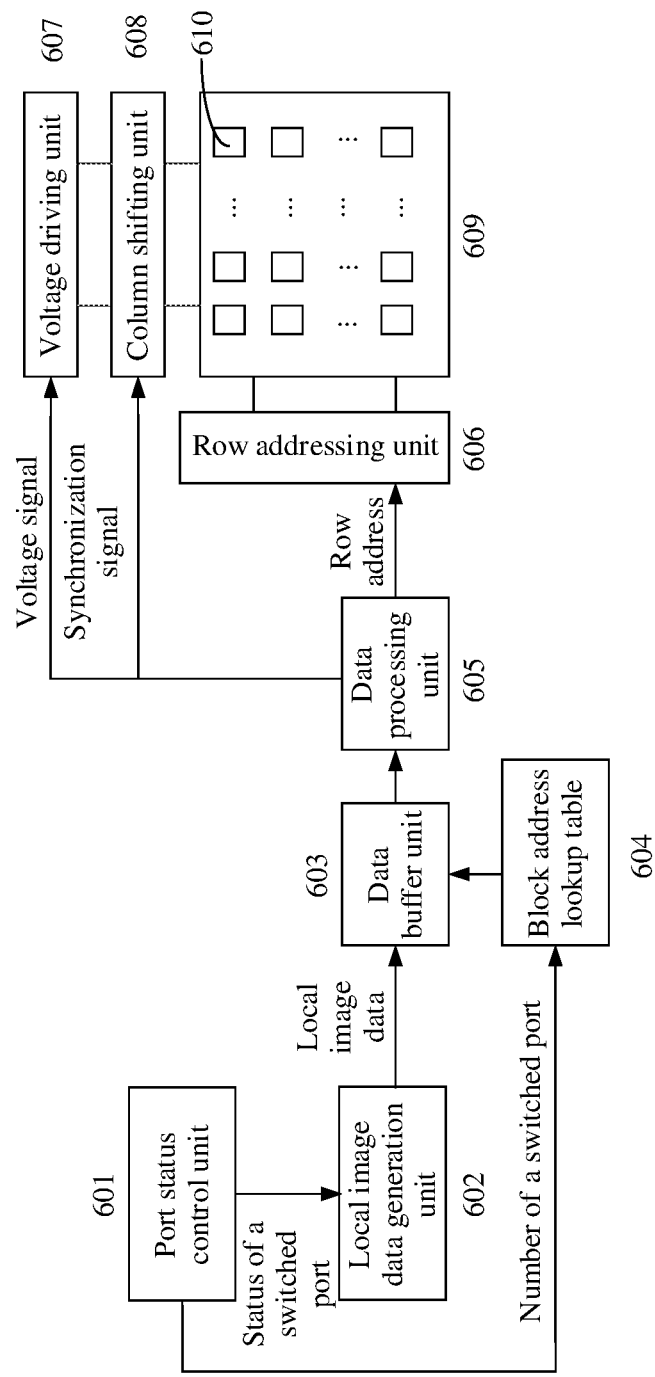
FIG. 11 is another example of an LCoS circuit module according to this disclosure.

Refer to FIG. 11. FIG. 11 is another example of an LCoS circuit module according to this disclosure. As shown in FIG. 11, the LCoS circuit module includes the following units: a port status control unit (601), a local image data generation unit (602), a data buffer unit (603), a block address lookup table (604), a data processing unit (605), a row addressing unit (606), a voltage driving unit (607), a column shifting unit (608), and a pixel array unit (609) of an LCoS display screen. The pixel array unit (609) includes a plurality of rows of and a plurality of columns of pixels, for example, pixels (610) in FIG. 11. Optionally, these units may be collectively integrated into a single silicon chip, or may be separately implemented in a plurality of silicon chips or board-level circuits.

When the WSS apparatus is working, when receiving an instruction of switching one port or several ports, the port status control unit (601) transmits a port status of the switched port to the local image data generation unit (602), and transmits a port number of the switched port to the block address lookup table (604). The local image data generation unit (602) generates image data of a local image corresponding to the switched port based on the port status of the switched port, and transmits the image data to the data buffer unit (603). The block address lookup table (604) looks up, based on the port number of the switched port, a pixel number corresponding to the local image data, and transmits the pixel number to the data buffer unit (603).

The data processing unit (605) extracts, based on a subframe rate, the image data of the local image and the pixel number from the data buffer unit (603), and performs data processing.

The data processing unit (605) includes one pixel refresh queue, and the front of the pixel refresh queue is voltage signal data converted from image data of the local image and a row number corresponding to a pixel. The back of the pixel refresh queue is voltage signal data converted from other local image data that has changed in a last frame and a row number corresponding to a pixel. Specifically, the pixel refresh queue has a sequence from the latest to the earliest based on a time at which port switching occurs, where refreshing of a same row is performed in an ascending sequence of pixel numbers.

The data processing unit (605) transmits a row address corresponding to the row number to the row addressing unit (606), and transmits a synchronization signal to the column shifting unit (608), to perform shifting with individual rows in serial or a plurality of rows in parallel to enable writing. Further, the data processing unit (605) transmits a corresponding voltage signal to the voltage driving unit (607), and the voltage driving unit (607) loads the voltage signal to the corresponding pixel (610) in the pixel array unit (609), so as to complete refreshing of a driving voltage for each pixel.

In FIG. 9, the LOCS circuit module accurately obtains a row address and a column address in the pixel array of the LCoS display screen that correspond to a changed local image. Different from that, in FIG. 11, the LCoS circuit module obtains only a row address in the pixel array that corresponds to the changed local image. Therefore, in a process of refreshing a driving voltage, the LCoS circuit module preferentially refreshes, by combining row addressing with individual columns in serial or a plurality of columns in parallel, a driving voltage for a pixel in the pixel array that corresponds to a changed local image.

For example, if the row address in the pixel array that correspond to the changed local image is the fifth row, the LCoS circuit module refreshes a voltage from the first column of the fifth row, and continues to refresh to the last column of the fifth row. When a column is refreshed, the LCoS circuit module may preform refreshing column by column, or may perform refreshing with several columns in parallel, which specifically may be controlled by using the synchronization signal shown in FIG. 11.

An example of a process of refreshing a pixel driving voltage shown in FIG. 11 is used for description.

For example, it is assumed that the pixel array unit (509) includes 2000×1000 pixels, the WSS apparatus has N ports, where N=10, and each port supports M wavelength paths, where M=50. In this case, an optical signal with each wavelength corresponds to a pixel area including 200×20 pixels in the pixel array unit (509). As shown in FIG. 2, pixel numbers of pixels are sorted in an ascending sequence from lower left to upper right.

After the LCoS circuit module is enabled, an initial pixel refresh queue is sorted in an ascending sequence of pixel numbers. The LCoS circuit module calculates or looks up a driving voltage for a pixel based on a subframe rate, and performs updating. In addition, whether a port switching command is received is monitored based on the subframe rate.

When receiving the port switching command, for example, to switch an output port for an optical signal with the fifth wavelength from the third input port of the WSS apparatus, the port status control unit (601) waits for a last subframe to complete. As a current subframe comes, the port switching command is monitored, and refreshing is performed in the current subframe. First, a changed local image of an LCoS image is calculated, image data of the local image is loaded into an LCoS buffer, for example, a data buffer unit (603) in FIG. 7, and then the pixel refresh queue is sorted based on a priority. Rows (whose row numbers of pixels are from a row 401 to a row 600) covered by a pixel area in the pixel array unit that corresponds to the fifth wavelength from the third input port is at the front of the pixel refresh queue, and at the back, row numbers of pixels are sorted from 1 to 400 and from 601 to 2000. Then, the data processing unit (605) calculates or looks up a driving voltage for a pixel and perform refreshing according to a row sequence given in the pixel refresh queue. Pixels in a same row are refreshed in an ascending sequence of pixel numbers of the pixels.

It should be understood that the WSS apparatus includes 10 input ports, each input port supports 50 wavelengths, and the pixel array unit (609) includes 2000×1000 pixels. According to a correspondence between an LCoS image and the pixel array unit (609), each input port corresponds to 200 rows in the pixel array unit (609), and an optical signal with each wavelength corresponds to 20 columns in the pixel array unit (609). It should be understood that the input port may alternatively correspond to a column in the pixel array unit (709), and the optical signal with each wavelength may alternatively correspond to a row in the pixel array unit (709). This is not limited in this disclosure.

For example, when switching of an output port for an optical signal with the fifth wavelength from the third input port occurs, the LCoS device preferentially refreshes, in the manner (2) of refreshing a pixel driving voltage in step 340 in FIG. 3, a pixel area (namely, the first area) in the pixel array unit (509) that corresponds to the third input port. In this example, the first area is a pixel area including all pixels in the $401^{st}$ to $600^{th}$ rows in the pixel array unit (509). It can be learned that, in addition to a pixel in the first pixel area, the first area further includes pixels in the $401^{st}$ to $600^{th}$ rows and another column in the pixel array unit (609). The first pixel area includes elements in the $81^{st}$ to $100^{th}$ columns and the $401^{st}$ to $600^{th}$ rows in the pixel array unit (609). In this embodiment, a size of the first area is greater than a size of the first pixel area.

In can be learned that, in a process of refreshing a pixel driving voltage, row addressing is performed, and for a column, shifting is performed with individual columns in serial or a plurality of columns in parallel. Therefore, a pixel address for transmission of the data transmission unit is only a row address, thereby reducing overheads taken up by a pixel address, and improving effective bandwidth utilization.

In particular, because a quantity of wavelengths is often greater than a quantity of ports, when a wavelength direction of the WSS apparatus is a row direction, generally, a waiting time is shorter than that in a case of along a column direction.

Figure 12:
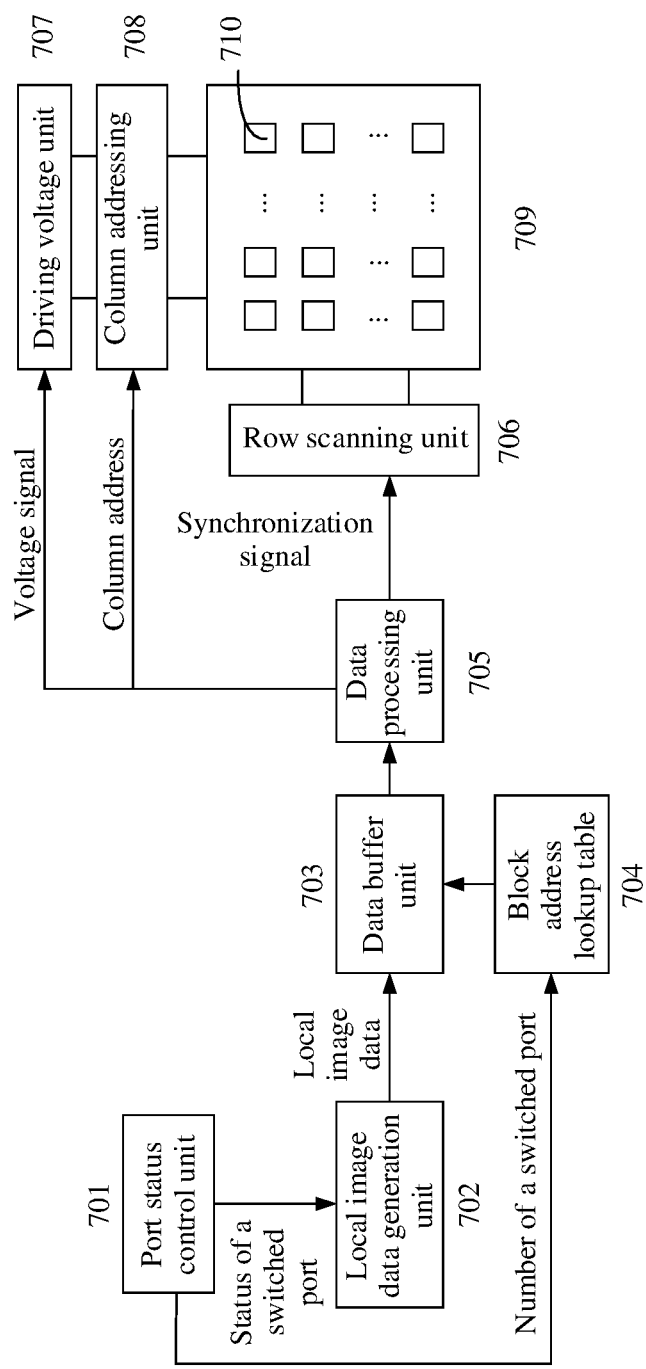
FIG. 12 is another example of an LCoS circuit module according to this disclosure.

Refer to FIG. 12. FIG. 12 is another example of an LCoS circuit module according to this disclosure. As shown in FIG. 12, the LCoS circuit module includes the following units: a port status control unit (701), a local image data generation unit (702), a data buffer unit (703), a block address lookup table (704), a data processing unit (705), a row scanning unit (706), a voltage driving unit (707), a column addressing unit (708), and a pixel array unit (709) of an LCoS display screen. The pixel array unit (709) includes a plurality of rows of and a plurality of columns of pixels, for example, pixels (710) shown in FIG. 12. Optionally, these units may be collectively integrated into a single silicon chip, or may be separately implemented in a plurality of silicon chips or board-level circuits.

A function of the LCoS circuit module is to convert image data that is output from the port status control unit (701) and that corresponds to a port to which switching has occurred into driving voltages for the pixels (710) in the pixel array unit (709), so as to drive the liquid crystal of the LCoS display screen to work. A port status in the port status control unit (701) changes at any time.

In the foregoing process, when the port status control unit (701) receives an instruction of switching a status of one port or statuses of several ports, the port status control unit (701) transmits a status of the switched port to the local image data generation unit (702), and transmits a port number of the switched port to the block address lookup table (704). The local image data generation unit (702) generates local image data based on the status of the switched port, and transmits the local image data to the data buffer unit (703). The block address lookup table (704) looks up, based on the number of the switched port, a column address of the local image data, and transmits the address to the data buffer unit (703).

The data processing unit (705) extracts, based on a subframe rate, the local image data and the pixel number of the local image data from the data buffer unit (703), and performs data processing. The data processing unit (705) includes one pixel refresh queue. The front of the pixel refresh queue is voltage signal data converted from the local image data and a column number corresponding to a pixel. The back of the pixel refresh queue is voltage signal data converted from other local image data that has changed in a last frame and a column number corresponding to a pixel. Specifically, the pixel refresh queue has a sequence from the latest to the earliest based on a time at which port switching occurs, where pixel numbers of pixels, in a column, corresponding to a same port are ranked in an ascending sequence.

The data processing unit (705) transmits a column address corresponding to the column number to the column addressing unit (708), and transmits a synchronization signal to the row scanning unit (706), to perform scanning row by row to enable writing. Further, the data processing unit (705) transmits a corresponding voltage signal to the voltage driving unit (707), and the voltage driving unit (707) loads the voltage signal to a corresponding pixel in the pixel array unit (709), so as to complete refreshing of a driving voltage for each pixel.

It should be understood that the WSS apparatus includes 10 input ports, each input port supports 50 wavelengths, and the pixel array unit (709) includes 2000×1000 pixels. According to a correspondence between an LCoS image and the pixel array unit (709), each input port corresponds to 200 rows in the pixel array unit (709), and an optical signal with each wavelength corresponds to 20 columns in the pixel array unit (709). It should be understood that the input port may alternatively correspond to a column in the pixel array unit (709), and the optical signal with each wavelength may alternatively correspond to a row in the pixel array unit (709). This is not limited in this disclosure.

For example, when switching of an output port for an optical signal with the fifth wavelength from the third input port occurs, the LCoS device preferentially refreshes, in the refreshing manner (3) in step 340 in FIG. 3, a driving voltage for a pixel in a pixel area (namely, a first area), in the pixel array unit (709), that corresponds to an optical signal with the fifth wavelength from the 10 input ports of the WSS apparatus. The first area is a pixel area including all pixels in the $81^{st}$ to $100^{th}$ columns in the pixel array unit (709).

In this example, in addition to a pixel in a first pixel area in the pixel array unit (709), the first area further includes pixels in the $81^{st}$ to $100^{th}$ columns and another row in the pixel array unit (709). The first pixel area includes elements in the $81^{st}$ to $100^{th}$ columns and the $401^{st}$ to $600^{th}$ rows in the pixel array unit (709). In this embodiment, a size of the first area is greater than a size of the first pixel area.

In FIG. 9, the LOCS circuit module accurately obtains a row address and a column address in the pixel array of the LCoS display screen that correspond to a changed local image. Different from that, in FIG. 12, the LCoS circuit module obtains only a column address in the pixel array that corresponds to the changed local image. Therefore, in a process of refreshing a driving voltage, the LCoS circuit module preferentially refreshes, by combining column addressing with individual rows in serial or a plurality of rows in parallel, a driving voltage for a pixel in the pixel array that corresponds to a changed local image.

For example, if the column address in the pixel array that correspond to the changed local image is the ninth column, the LCoS circuit module refreshes a voltage from the first row of the ninth column, and continues to refresh to the last row of the ninth column. During the refreshing, the LCoS circuit module may preform refreshing row by row, or may perform refreshing with several rows in parallel, which specifically may be controlled by using the synchronization signal shown in FIG. 9.

Optionally, all units of any LCoS circuit module shown in FIG. 9 to FIG. 12 may be integrated into one chip, or some of the units are in one (or more) circuit boards, and the other units are in one chip. For example, in FIG. 9, units numbered 506 to 510 are in one chip, and other units are in one circuit board or the like. Specific implementation of software and hardware of the circuit modules shown in FIG. 9 to FIG. 12 are not limited in this specification.

The method of wavelength selection provided in this disclosure is described in detail above, and the following describes a communication apparatus provided in this disclosure.

Figure 13:
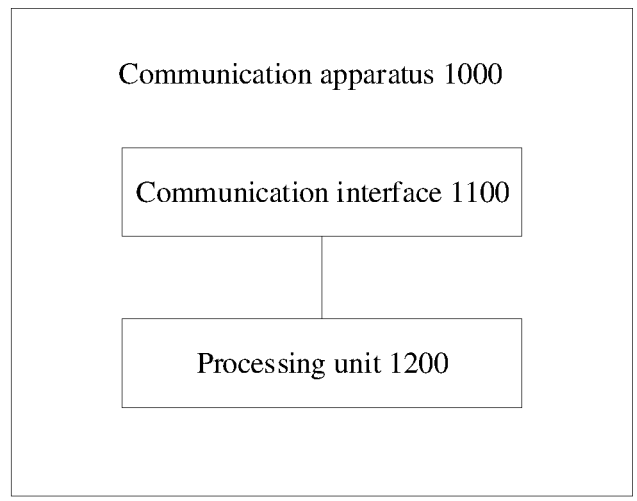
FIG. 13 is a schematic block diagram of a communication apparatus according to this disclosure.

Refer to FIG. 13. FIG. 13 is a schematic block diagram of a communication apparatus according to this disclosure. As shown in FIG. 13, the communication apparatus 1000 includes a communication interface 1100 and a processing unit 1200.

The communication interface 1100 is configured to obtain port status information of a WSS apparatus, where the port status information includes information that for an optical signal with a first wavelength from a first input port, a first output port is to be switched to a second output port, where the WSS apparatus includes N input ports, each input port supports M wavelengths, and both N and M are positive integers; and the processing unit 1200 is configured to:

update a sub-image that is of an LCoS image of the WSS apparatus and that corresponds to the optical signal with the first wavelength from the first input port to a first sub-image, where the LCoS image is divided into N×M sub-images, and each sub-image corresponds to one pixel area on an LCoS display screen of the WSS apparatus;

refresh, based on the first sub-image, a driving voltage for a pixel in a first area on the LCoS display screen, where the first area includes a first pixel area on the LCoS display screen that corresponds to the first sub-image; and refresh a driving voltage for a pixel in another area on the LCoS display screen that is not the first area.

Optionally, in an embodiment, the communication interface 1100 is configured to:

receive a port switching command within a $(j-1)^{th}$ time interval, where the port switching command is used to instruct a switch from the first output port to the second output port for the optical signal with the first wavelength from the first input port; and the processing unit 1200 is specifically configured to:

update, within a $j^{th}$ time interval, the sub-image that is of the LCoS image and that corresponds to the optical signal with the first wavelength from the first input port to the first sub-image, where j≥1, j is an integer, and one time interval is shorter than duration of one image frame.

Optionally, in an embodiment, the processing unit 1200 is configured to:

obtain a port status and a port number of the first input port according to the port switching command;

generate image data of the first sub-image based on the port status of the first input port, and determine, based on the port number of the first input port, the first pixel area on the LCoS display screen that corresponds to the first sub-image; and determine, based on the image data of the first sub-image, a driving voltage that needs to be loaded to a pixel in the first pixel area.

Optionally, in an embodiment, the processing unit 1200 is further configured to:

generate a pixel refresh queue, where the pixel refresh queue includes a driving voltage for a pixel on the LCoS display screen that corresponds to the N input ports of the WSS apparatus; and the processing unit 1200 is specifically configured to:

update the driving voltage that is for the pixel in the first pixel area and that is included in the pixel refresh queue to the driving voltage, determined based on the image data of the first sub-image, that needs to be loaded to the pixel in the first pixel area; and obtain the driving voltage for the pixel in the first area from the pixel refresh queue, and load the driving voltage to a corresponding pixel in a pixel array of the LCoS display screen.

Optionally, in an embodiment, the processing unit 1200 is further configured to:

adjust a priority of a pixel number of a pixel that is in the pixel refresh queue and that corresponds to the optical signal with the first wavelength from the first input port to a higher priority than a priority of a pixel number of another pixel, where the pixel refresh queue further includes a pixel number of the pixel on the LCoS display screen that corresponds to the N input ports, and a priority of each pixel number in the pixel refresh queue indicates a priority of refreshing a driving voltage for a pixel corresponding to the pixel number; and the processing unit 1200 is specifically configured to:

refresh, based on an adjusted priority of each pixel number in the pixel refresh queue, the driving voltage for the pixel in the another area on the LCoS display screen that is not the first area, where the first area is the first pixel area.

Optionally, in an embodiment, the processing unit 1200 is further configured to:

adjust a priority of a pixel number of a pixel that is in the pixel refresh queue and that corresponds to the first input port to a higher priority than a priority of a pixel number of a pixel on the LCoS display screen that corresponds to another port of the WSS apparatus, where the pixel refresh queue includes a pixel number of the pixel on the LCoS display screen that corresponds to the N input ports, and a priority of each pixel number in the pixel refresh queue indicates a priority of refreshing a driving voltage for a pixel corresponding to the pixel number; and the processing unit 1200 is specifically configured to:

refresh, based on an adjusted priority of each pixel number in the pixel refresh queue, the driving voltage for the pixel in the another area on the LCoS display screen that is not the first area, where the first area is a pixel area on the LCoS display screen that corresponds to the first input port.

Optionally, in an embodiment, the processing unit 1200 is further configured to:

adjust a priority of a pixel number of a pixel that is in the pixel refresh queue and that corresponds to an optical signal with the first wavelength from the N input ports to a higher priority than a priority of a pixel number of a pixel corresponding to an optical signal with another wavelength from the N input ports, where the pixel refresh queue includes a pixel number of the pixel on the LCoS display screen that corresponds to the N input ports, and a priority of each pixel number in the pixel refresh queue indicates a priority of refreshing a driving voltage for a pixel corresponding to the pixel number; and the processing unit 1200 is specifically configured to:

refresh, based on an adjusted priority of each pixel number in the pixel refresh queue, the driving voltage for the pixel in the another area on the LCoS display screen that is not the first area, where the first area is a pixel area on the LCoS display screen that corresponds to the optical signal with the first wavelength from the N input ports.

Optionally, in an embodiment, the pixel on the LCoS display screen that corresponds to the first input port includes the pixel in the first pixel area, and the priority of refreshing the driving voltage for the pixel in the first pixel area is higher than a priority of refreshing a driving voltage for a pixel on the LCoS display screen that corresponds to an optical signal with another wavelength from the first input port that is not the first wavelength, where the processing unit 1200 is specifically configured to:

refresh a pixel in the pixel area on the LCoS display screen that corresponds to the optical signal with another wavelength from the first input port; and refresh a pixel in a pixel area on the LCoS display screen that corresponds to another input port of the WSS apparatus that is not the first input port.

Optionally, in an embodiment, the processing unit 1200 is further configured to:

obtain a row address and a column address that are in the pixel array of the LCoS display screen and that correspond to the pixel number of the pixel in the first area; and the processing unit 1200 is specifically configured to:

obtain based on the adjusted priority of each pixel number in the pixel refresh queue, a driving voltage corresponding to the pixel number of the pixel in the first area from the pixel refresh queue; and perform addressing in the pixel array based on the row address and the column address that are in the pixel array and that correspond to the pixel number of the pixel in the first area, and load the driving voltage corresponding to the pixel number of the pixel in the first area to the pixel corresponding to the row address and the column address in the pixel array.

Optionally, in an embodiment, the processing unit 1200 is further configured to:

obtain a row address that is in the pixel array of the LCoS display screen and that corresponds to the pixel number of the pixel in the first area; and the processing unit 1200 is specifically configured to:

obtain based on the adjusted priority of each pixel number in the pixel refresh queue, a driving voltage corresponding to the pixel number of the pixel in the first area from the pixel refresh queue; and perform row addressing in the pixel array based on the row address that is in the pixel array and that corresponds to the pixel number of the pixel in the first area, and load, with individual columns in serial or a plurality of columns in parallel, the driving voltage corresponding to the pixel number of the pixel in the first area to the pixel corresponding to the row address in the pixel array.

Optionally, in an embodiment, the processing unit 1200 is further configured to:

obtain a column address that is in the pixel array of the LCoS display screen and that corresponds to a pixel number of the pixel in the first area; and the processing unit 1200 is specifically configured to:

obtain based on the adjusted priority of each pixel number in the pixel refresh queue, a driving voltage corresponding to the pixel number of the pixel in the first area from the pixel refresh queue; and perform column addressing in the pixel array based on the column address that is in the pixel array and that corresponds to the pixel number of the pixel in the first area, and load, with individual rows in serial or a plurality of rows in parallel, the driving voltage corresponding to the pixel number of the pixel in the first area to the pixel corresponding to the column address in the pixel array.

Optionally, in an embodiment, the processing unit 1200 is further configured to:

when switching of an output port for an optical signal from each input port of the WSS apparatus does not occur, refresh, within each time interval, based on a priority of each pixel number in a pixel refresh queue, a driving voltage for a pixel on the LCoS display screen that corresponds to the pixel number, where one time interval is shorter than duration of one image frame, where the pixel refresh queue includes a pixel number of a pixel on the LCoS display screen that corresponds to the N input ports, and a priority of each pixel number in the pixel refresh queue indicates a priority of refreshing a driving voltage for a pixel corresponding to the pixel number.

In the foregoing implementations, the communication interface 1100 may include an input interface and an output interface. The input interface is configured to implement a function of inputting (or receiving), and the output interface is configured to implement a function of outputting (or sending). This is not limited herein.

Optionally, the communication interface 1100 may alternatively be an interface circuit. For example, a receiver circuit may include an input circuit and an output circuit.

Optionally, in an example, the communication apparatus 1000 may be the LCoS device in the method embodiments, or may be a chip, an integrated circuit, a component, a module, or the like that is in the LCoS device and that implements the functions of the LCoS.

In various examples, the processing unit 1200 is configured to perform processing and/or operations of the LCoS device that is/are implemented inside the LCoS device except actions of sending and receiving.

For example, the processing unit 1200 is configured to: perform steps 320 to 340 in FIG. 3 and steps 402 to 412 in FIG. 7, or perform operations and/or processing performed by the port status control unit (501), the local image data generation unit (502), and the data processing unit (505) in FIG. 9, or perform operations and/or processing performed by the port status control unit (601), the local image data generation unit (602), and the data processing unit (605) in FIG. 11, or perform operations and/or processing performed by the port status control unit (701), the local image data generation unit (702), and the data processing unit (705) in FIG. 12, and so on.

Optionally, the processing unit 1200 may be a processing apparatus. A function of the processing apparatus may be implemented by hardware, or may be implemented by hardware executing corresponding software. For example, the processing apparatus may include at least one processor and at least one memory. The at least one memory is configured to store a computer program, and the at least one processor reads and executes the computer program stored in the at least one memory, to enable the communication apparatus 1000 to perform operations and/or processing performed by the LCoS device in the method embodiments.

Optionally, the processing apparatus may include only the processor, and the memory configured to store the computer program is located outside the processing apparatus. The processor is connected to the memory through a circuit/wire, to read and execute the computer program stored in the memory.

In some examples, the processing apparatus may alternatively be a chip or an integrated circuit. For example, the processing apparatus includes a processing circuit/logic circuit and an interface circuit. The interface circuit is configured to: receive a signal and/or data, and transmit the signal and/or data to the processing circuit. The processing circuit processes the signal and/or data, to implement functions of the LCoS device in the method embodiments.

Figure 14:
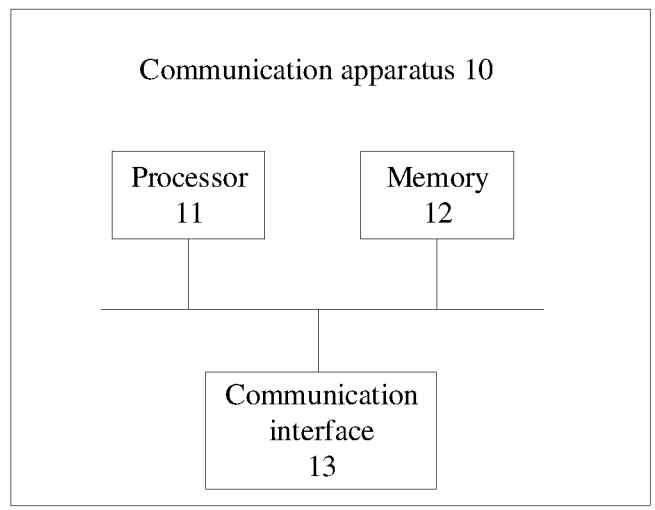
FIG. 14 is a schematic diagram of a structure of a communication apparatus according to this disclosure.

Refer to FIG. 14. FIG. 14 is a schematic diagram of a structure of a communication apparatus according to this disclosure. As shown in FIG. 14, the communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and run the computer program, so that the communication apparatus 10 performs processing and/or operations performed by the LCoS device in the method embodiments of this disclosure.

For example, the processor 11 may have a function of the processing unit 1200 in FIG. 13, and the communication interface 13 may have a function of the communication interface 1100 in FIG. 13. Specifically, the processor 11 may be configured to perform processing or operations performed inside the LCoS device in FIG. 1 to FIG. 12, and the communication interface 13 is configured to perform actions of sending and/or receiving performed by the LCoS device in FIG. 1 to FIG. 12.

In addition, the memory 12 may be configured to implement a storage function. For example, the memory 12 has corresponding functions of the data buffer unit (503) and a block address lookup table (504) in FIG. 9, has a function of a pixel refresh queue (513) shown in FIG. 9, has corresponding functions of a data buffer unit (603) and a block address lookup table (604) in FIG. 11, or has corresponding functions of a data buffer unit (703) and a block address lookup table (704) in FIG. 12, or the like.

Optionally, the memory and the processor in the foregoing apparatus embodiments may be physically independent units, or the memory may be integrated into the processor. This is not limited in this specification.

In addition, this disclosure further provides a computer-readable storage medium. The computer-readable storage medium stores computer instructions, and when the computer instructions are run on a computer, the computer is enabled to perform operations and/or procedures performed by the LCoS device in the method embodiments of this disclosure.

In addition, this disclosure further provides a computer program product. The computer program product includes computer program code or instructions, and when the computer program code or instructions are run on a computer, operations and/or procedures performed by the LCoS device in the method embodiments of this disclosure are performed.

In addition, this disclosure further provides a chip. The chip includes a processor, and a memory configured to store a computer program is disposed independently from the chip. The processor is configured to execute the computer program stored in the memory, to enable an LCoS device on which the chip is mounted to perform operations and/or processing performed by the LCoS device in any one of the method embodiments.

Further, the chip may include a communication interface. The communication interface may be an input/output interface, an interface circuit, or the like. Further, the chip may include the memory.

In addition, this disclosure further provides a communication apparatus (that, for example, may be a chip), including a processor and a communication interface. The communication interface is configured to: receive a signal, and transmit the signal to the processor, and the processor processes the signal, to perform operations and/or processing performed by the LCoS device in any one of the method embodiments.

In addition, this disclosure further provides a communication apparatus, including at least one processor. The at least one processor is coupled to at least one memory, and the at least one processor is configured to execute a computer program or instructions stored in the at least one memory, to perform operations and/or processing performed by the LCoS device in any one of the method embodiments.

In addition, this disclosure further provides an LCoS device that has a function of implementing the LCoS device in the embodiments of this disclosure.

This disclosure further provides a WSS apparatus, including the LCoS device in the embodiments of this disclosure.

This disclosure further provides an optical switching apparatus, including the foregoing WSS apparatus.

A processor in an embodiment of this disclosure may be an integrated circuit chip and capable of processing a signal. During implementation, the steps in the foregoing method embodiments are implemented by using a hardware integrated logic circuit in the processor or instructions in a form of software. The processor may be a general-purpose processor, a digital signal processor ( ), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps in the method disclosed in the embodiments of this disclosure may be directly presented as being performed and completed by a hardware encoding processor, or performed and completed by a combination of hardware and software modules in an encoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

The memory in the embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external buffer. Through examples but not limitative descriptions, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory in the system and method described in this specification is intended to include, but is not limited to, these and any memory of another appropriate type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, a corresponding process in the foregoing method embodiments may be referred to. Details are not described herein again.

In several embodiments provided in this disclosure, it should be understood that the disclosed system, apparatus, and method may be implemented in another manner. For example, the described apparatus embodiments are merely examples, and the division into the units is merely logical function division and may be other division in actual implementation. For example, a plurality of units or components may be combined or integrated into another system, or some features may be ignored or not performed. In addition, the displayed or discussed mutual coupling or direct coupling or communication connections may be implemented through some interfaces. The indirect coupling or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, functional units in the embodiments of this disclosure may be integrated into one processing unit, each of the units may exist alone physically, or two or more units may be integrated into one unit. When being implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (that may be a personal computer, a server, or a network device) to perform all or some of the steps of the method described in the embodiments of this disclosure.

The foregoing descriptions are merely specific implementations of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method of wavelength selection, the method comprising:
   obtaining port status information of a wavelength selective switch (WSS) apparatus, wherein the port status information comprises information that for an optical signal with a first wavelength from a first input port of the WSS apparatus, a first output port is to be switched to a second output port, the WSS apparatus comprises N input ports, each of the input ports supports M wavelengths, and both N and M are positive integers;
   updating a sub-image that is of a liquid crystal on silicon (LCoS) image of the WSS apparatus and that corresponds to the optical signal with the first wavelength from the first input port to a first sub-image, wherein the LCoS image is divided into N×M sub-images, and each sub-image corresponds to one pixel area on an LCoS display screen of the WSS apparatus;
   refreshing, based on the first sub-image, a first driving voltage for a pixel in a first area on the LCoS display screen, wherein the first area comprises a first pixel area on the LCoS display screen that corresponds to the first sub-image; and
   refreshing another driving voltage for another pixel in another area on the LCoS display screen that is not the first area;
   wherein the method further comprises an additional feature (i) or (ii) as follows:
   (i) the obtaining of the port status information of the WSS apparatus comprises:
      receiving a port switching command within a $(j-1)^{th}$ time interval, wherein the port switching command is used to instruct a switch from the first output port to the second output port for outputting the optical signal with the first wavelength from the first input port; and
      the updating of the sub-image that is of the LCoS image of the WSS apparatus and that corresponds to the optical signal with the first wavelength from the first input port to the first sub-image comprises:
      updating, within a $j^{th}$ time interval, the sub-image that is of the LCoS image and that corresponds to the optical signal with the first wavelength from the first input port to the first sub-image, wherein $j \geq 1$, j is an integer, and one time interval is shorter than duration of one image frame; or
   (ii) when switching of an output port for an optical signal from each of the input ports of the WSS apparatus does not occur, refreshing, within each time interval based on a priority of each pixel number in a pixel refresh queue, a driving voltage for a pixel on the LCoS display screen that corresponds to the pixel number, wherein one time interval is shorter than duration of one image frame, wherein
      the pixel refresh queue comprises a pixel number of a pixel on the LCoS display screen that corresponds to the N input ports, and a priority of each pixel number in the pixel refresh queue corresponds to a priority of refreshing a driving voltage for a pixel corresponding to the pixel number.

2. The method according to claim 1 wherein the method further comprises the additional feature (i).

3. The method according to claim 2, wherein the method further comprises:
   obtaining a port status and a port number of the first input port according to the port switching command;
   generating image data of the first sub-image based on the port status of the first input port, and determining, based on the port number of the first input port, the first pixel area on the LCoS display screen that corresponds to the first sub-image; and
   determining, based on the image data of the first sub-image, a driving voltage that needs to be loaded to a pixel in the first pixel area.

4. The method according to claim 3, wherein before the port status information of the WSS apparatus is obtained, the method further comprises:
   generating a pixel refresh queue, wherein the pixel refresh queue comprises a driving voltage for a pixel on the LCoS display screen that corresponds to the N input ports of the WSS apparatus; and the refreshing, based on the first sub-image, of the first driving voltage for the pixel in the first area on the LCoS display screen comprises:
updating the driving voltage that is for the pixel in the first pixel area and that is comprised in the pixel refresh queue to the driving voltage, determined based on the image data of the first sub-image, that needs to be loaded to the pixel in the first pixel area; and
obtaining the driving voltage for the pixel in the first area from the pixel refresh queue, and loading the driving voltage to a corresponding pixel in a pixel array of the LCoS display screen.

5. The method according to claim 4, wherein after the port status information of the WSS apparatus is obtained, the method further comprises:
adjusting a priority of a pixel number of a pixel that is in the pixel refresh queue and that corresponds to the optical signal with the first wavelength from the first input port to a higher priority than a priority of a pixel number of another pixel, wherein the pixel refresh queue further comprises a pixel number of the pixel on the LCoS display screen that corresponds to the N input ports, and the priority of each pixel number in the pixel refresh queue indicates the priority of refreshing the driving voltage for the pixel corresponding to the pixel number; and
the refreshing of the another driving voltage for the another pixel in the another area on the LCoS display screen that is not the first area comprises:
refreshing, based on an adjusted priority of each pixel number in the pixel refresh queue, the another driving voltage for the another pixel in the another area on the LCoS display screen that is not the first area, wherein the first area is the first pixel area.

6. The method according to claim 5, wherein the method further comprises:
obtaining a row address and a column address that are in the pixel array of the LcoS display screen and that correspond to a pixel number of the pixel in the first area; and
the obtaining of the driving voltage for the pixel in the first area from the pixel refresh queue, and the loading of the driving voltage to the corresponding pixel in the pixel array of the LCoS display screen comprises:
obtaining, based on the adjusted priority of each pixel number in the pixel refresh queue, a driving voltage corresponding to the pixel number of the pixel in the first area from the pixel refresh queue; and
performing addressing in the pixel array based on the row address and the column address that are in the pixel array and that correspond to the pixel number of the pixel in the first area, and loading the driving voltage corresponding to the pixel number of the pixel in the first area to the pixel corresponding to the row address and the column address in the pixel array.

7. The method according to claim 4, wherein after the port status information of the WSS apparatus is obtained, the method further comprises:
adjusting a priority of a pixel number of a pixel that is in the pixel refresh queue and that corresponds to the first input port to a higher priority than a priority of a pixel number of a pixel on the LCoS display screen that corresponds to another port of the WSS apparatus, wherein the pixel refresh queue comprises a pixel number of the pixel on the LCoS display screen that corresponds to the N input ports, and the priority of each pixel number in the pixel refresh queue indicates the priority of refreshing the driving voltage for the pixel corresponding to the pixel number; and
the refreshing of the another driving voltage for the another pixel in the another area on the LCoS display screen that is not the first area comprises:
refreshing, based on an adjusted priority of each pixel number in the pixel refresh queue, the another driving voltage for the another pixel in the another area on the LCoS display screen that is not the first area, wherein the first area is a pixel area on the LCoS display screen that corresponds to the first input port.

8. The method according to claim 7, wherein the method further comprises:
obtaining a row address that is in the pixel array of the LCoS display screen and that corresponds to a pixel number of the pixel in the first area; and
the obtaining of the driving voltage for the pixel in the first area from the pixel refresh queue, and the loading of the driving voltage to the corresponding pixel in the pixel array of the LcoS display screen comprises:
obtaining, based on the adjusted priority of each pixel number in the pixel refresh queue, a driving voltage corresponding to the pixel number of the pixel in the first area from the pixel refresh queue; and
performing row addressing in the pixel array based on the row address that is in the pixel array and that corresponds to the pixel number of the pixel in the first area, and loading, with individual columns in serial or a plurality of columns in parallel, the driving voltage corresponding to the pixel number of the pixel in the first area to the pixel corresponding to the row address in the pixel array.

9. The method according to claim 4, wherein after the port status information of the WSS apparatus is obtained, the method further comprises:
adjusting a priority of a pixel number of a pixel that is in the pixel refresh queue and that corresponds to an optical signal with the first wavelength from the N input ports to a higher priority than a priority of a pixel number of a pixel corresponding to an optical signal with another wavelength from the N input ports, wherein the pixel refresh queue comprises a pixel number of the pixel on the LCoS display screen that corresponds to the N input ports, and the priority of each pixel number in the pixel refresh queue indicates the priority of refreshing the driving voltage for the pixel corresponding to the pixel number; and
the refreshing of the another driving voltage for the another pixel in the another area on the LCoS display screen that is not the first area comprises:
refreshing, based on an adjusted priority of each pixel number in the pixel refresh queue, the another driving voltage for the another pixel in the another area on the LcoS display screen that is not the first area, wherein the first area is a pixel area on the LcoS display screen that corresponds to the optical signal with the first wavelength from the N input ports.

10. The method according to claim 9, wherein the method further comprises:
obtaining a column address that is in the pixel array of the LcoS display screen and that corresponds to a pixel number of the pixel in the first area; and
the obtaining of the driving voltage for the pixel in the first area from the pixel refresh queue, and the loading of the driving voltage to the corresponding pixel in the pixel array of the LCoS display screen comprises:

obtaining, based on the adjusted priority of each pixel number in the pixel refresh queue, a driving voltage corresponding to the pixel number of the pixel in the first area from the pixel array; and performing column addressing in the pixel array based on the column address that is in the pixel array and that corresponds to the pixel number of the pixel in the first area, and loading, with individual rows in serial or a plurality of rows in parallel, the driving voltage corresponding to the pixel number of the pixel in the first area to the pixel corresponding to the column address in the pixel array.

11. The method according to claim 1, wherein the method further comprises the additional feature (ii).

12. A communication apparatus comprising a processing circuit and a communication interface, wherein the communication interface is configured to: receive data and/or a signal that is to be processed, and transmit the data and/or signal to be processed to the processing circuit, and the processing circuit processes the data and/or signal, such that the communication apparatus is at least configured to:

obtain port status information of a wavelength selective switch (WSS) apparatus, wherein the port status information comprises information that for an optical signal with a first wavelength from a first input port of the WSS apparatus, a first output port is to be switched to a second output port, the WSS apparatus comprises N input ports, each of the input ports supports M wavelengths, and both N and M are positive integers;

update a sub-image that is of a liquid crystal on silicon LCoS image of the WSS apparatus and that corresponds to the optical signal with the first wavelength from the first input port to a first sub-image, wherein the LCoS image is divided into N×M sub-images, and each sub-image corresponds to one pixel area on an LCoS display screen of the WSS apparatus;

refresh, based on the first sub-image, a first driving voltage for a pixel in a first area on the LCoS display screen, wherein the first area comprises a first pixel area on the LCoS display screen that corresponds to the first sub-image; and refresh another driving voltage for another pixel in another area on the LCoS display screen that is not the first area;

wherein the communication apparatus is further configured to perform an additional feature (i) or (ii) as follows:

(i) receive a port switching command within a $(j-1)^{th}$ time interval, wherein the port switching command is used to instruct a switch from the first output port to the second output port for outputting the optical signal with the first wavelength from the first input port; and the update of the sub-image that is of the LCoS image of the WSS apparatus and that corresponds to the optical signal with the first wavelength from the first input port to the first sub-image comprises:

update, within a $j^{th}$ time interval, the sub-image that is of the LCoS image and that corresponds to the optical signal with the first wavelength from the first input port to the first sub-image, wherein j≥1, j is an integer, and one time interval is shorter than duration of one image frame; or (ii) when switching of an output port for an optical signal from each of the input ports of the WSS apparatus does not occur, refresh, within each time interval based on a priority of each pixel number in a pixel refresh queue, a driving voltage for a pixel on the LCoS display screen that corresponds to the pixel number, wherein one time interval is shorter than duration of one image frame, wherein the pixel refresh queue comprises a pixel number of a pixel on the LCoS display screen that corresponds to the N input ports, and a priority of each pixel number in the pixel refresh queue corresponds to a priority of refreshing a driving voltage for a pixel corresponding to the pixel number.

13. The communication apparatus according to claim 12, wherein the communication apparatus is further configured to perform the additional feature (i).

14. The communication apparatus according to claim 13, wherein the communication apparatus is further configured to:

obtain a port status and a port number of the first input port according to the port switching command;

generate image data of the first sub-image based on the port status of the first input port, and determine, based on the port number of the first input port, the first pixel area on the LCoS display screen that corresponds to the first sub-image; and determine, based on the image data of the first sub-image, a driving voltage that needs to be loaded to a pixel in the first pixel area.

15. The communication apparatus according to claim 14, wherein the communication apparatus is further configured to, before the port status information of the WSS apparatus is obtained:

generate a pixel refresh queue, wherein the pixel refresh queue comprises a driving voltage for a pixel on the LCoS display screen that corresponds to the N input ports of the WSS apparatus; and in order to perform the refreshing, based on the first sub-image, of the first driving voltage for the pixel in the first area on the LCoS display screen, the communication apparatus is further configured to:

update the driving voltage that is for the pixel in the first pixel area and that is comprised in the pixel refresh queue to the driving voltage, determined based on the image data of the first sub-image, that needs to be loaded to the pixel in the first pixel area; and obtain the driving voltage for the pixel in the first area from the pixel refresh queue, and load the driving voltage to a corresponding pixel in a pixel array of the LCoS display screen.

16. The communication apparatus according to claim 15, wherein the communication apparatus is further configured to, after the port status information of the WSS apparatus is obtained:

adjust a priority of a pixel number of a pixel that is in the pixel refresh queue and that corresponds to the optical signal with the first wavelength from the first input port to a higher priority than a priority of a pixel number of another pixel, wherein the pixel refresh queue further comprises a pixel number of the pixel on the LCoS display screen that corresponds to the N input ports, and the priority of each pixel number in the pixel refresh queue indicates the priority of refreshing the driving voltage for the pixel corresponding to the pixel number; and in order to perform the refreshing of the another driving voltage for the another pixel in the another area on the LCoS display screen that is not the first area, the communication apparatus is further configured to:

refresh, based on an adjusted priority of each pixel number in the pixel refresh queue, the driving voltage for the pixel in the another area on the LCoS display screen that is not the first area, wherein the first area is the first pixel area.

17. A wavelength selective switch (WSS) apparatus comprising the communication apparatus of claim 12.

18. The WSS apparatus according to claim 17, wherein in order to obtain the port status information of the WSS apparatus, the communication apparatus of the WSS apparatus is further configured to:
receive a port switching command within a $(j-1)^{th}$ time interval, wherein the port switching command is used to instruct a switch from the first output port to the second output port for outputting the optical signal with the first wavelength from the first input port; and
in order to update the sub-image that is of the LCoS image of the WSS apparatus and that corresponds to the optical signal with the first wavelength from the first input port to the first sub-image, the communication apparatus of the WSS apparatus is further configured to:
update, within a $j^{th}$ time interval, the sub-image that is of the LCoS image and that corresponds to the optical signal with the first wavelength from the first input port to the first sub-image, wherein $j \geq 1$, j is an integer, and one time interval is shorter than duration of one image frame.

19. A non-transitory computer-readable storage medium, wherein the non-transitory computer-readable storage medium stores computer instructions such that when the computer instructions are run on a computer, the computer is caused to perform operation comprising:
obtaining port status information of a wavelength selective switch (WSS) apparatus, wherein the port status information comprises information that for an optical signal with a first wavelength from a first input port of the WSS apparatus, a first output port is to be switched to a second output port, the WSS apparatus comprises N input ports, each of the input ports supports M wavelengths, and both N and M are positive integers;
updating a sub-image that is of a liquid crystal on silicon (LCoS) image of the WSS apparatus and that corresponds to the optical signal with the first wavelength from the first input port to a first sub-image, wherein the LCoS image is divided into N×M sub-images, and each sub-image corresponds to one pixel area on an LCoS display screen of the WSS apparatus;
refreshing, based on the first sub-image, a first driving voltage for a pixel in a first area on the LCoS display screen, wherein the first area comprises a first pixel area on the LCoS display screen that corresponds to the first sub-image; and
refreshing another driving voltage for another pixel in another area on the LCoS display screen that is not the first area;
wherein the computer is further caused to perform operation comprising n additional feature (i) or (ii) as follows:
(i) the obtaining of the port status information of the WSS apparatus comprises:
receiving a port switching command within a $(j-1)^{th}$ time interval, wherein the port switching command is used to instruct a switch from the first output port to the second output port for outputting the optical signal with the first wavelength from the first input port; and
the updating of the sub-image that is of the LCoS image of the WSS apparatus and that corresponds to the optical signal with the first wavelength from the first input port to the first sub-image comprises:
updating, within a $j^{th}$ time interval, the sub-image that is of the LCoS image and that corresponds to the optical signal with the first wavelength from the first input port to the first sub-image, wherein $j \geq 1$, j is an integer, and one time interval is shorter than duration of one image frame; or
(ii) when switching of an output port for an optical signal from each of the input ports of the WSS apparatus does not occur, refreshing, within each time interval based on a priority of each pixel number in a pixel refresh queue, a driving voltage for a pixel on the LCoS display screen that corresponds to the pixel number, wherein one time interval is shorter than duration of one image frame, wherein
the pixel refresh queue comprises a pixel number of a pixel on the LCoS display screen that corresponds to the N input ports, and a priority of each pixel number in the pixel refresh queue corresponds to a priority of refreshing a driving voltage for a pixel corresponding to the pixel number.

20. The non-transitory computer-readable storage medium according to claim 19, wherein the computer is further caused to perform operation comprising the additional feature (i).

\* \* \* \* \*